United States Patent
Chen et al.

(10) Patent No.: US 12,273,206 B2
(45) Date of Patent: Apr. 8, 2025

(54) PARAMETER CONFIGURATION FOR CONFIGURED GRANT BASED MULTI-TRANSMISSION RECEPTION POINT COMMUNICATIONS

(71) Applicant: QUALCOMM Incorporated, San Diego, CA (US)

(72) Inventors: Yitao Chen, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/741,155

(22) Filed: May 10, 2022

(65) Prior Publication Data
US 2022/0368472 A1  Nov. 17, 2022

Related U.S. Application Data

(60) Provisional application No. 63/186,868, filed on May 11, 2021.

(51) Int. Cl.
*H04L 1/1867* (2023.01)
*H04L 1/1812* (2023.01)
(Continued)

(52) U.S. Cl.
CPC .......... *H04L 1/1887* (2013.01); *H04L 1/1819* (2013.01); *H04W 72/1268* (2013.01); *H04W 72/23* (2023.01)

(58) Field of Classification Search
None
See application file for complete search history.

(56) References Cited

U.S. PATENT DOCUMENTS 11,224,065 B2   1/2022   Jiang et al.
11,234,199 B2 *  1/2022   Xu ........................ H04W 52/36
(Continued)

FOREIGN PATENT DOCUMENTS

EP        3955667 A1     2/2022
EP        4040694 A1     8/2022
WO    WO-2021063044 A1   4/2021

OTHER PUBLICATIONS

International Search Report and Written Opinion—PCT/US2022/028765—ISA/EPO—Sep. 12, 2022.
(Continued)

*Primary Examiner* — Hong S Cho
(74) *Attorney, Agent, or Firm* — Holland & Hart LLP

(57) ABSTRACT

Methods, systems, and devices for wireless communications are described. Generally, the described techniques provide for a user equipment (UE) receiving control messages that schedule a first and second set of repetitions of an uplink transmission to respective transmission/reception points (TRPs). The one or more control messages may be indicative of a first redundancy version (RV) sequence that is to be applied to the first set of repetitions and a second RV sequence that is to be applied to the second set of repetitions. The control messages may also indicate a first set of power control parameters and a second set of power control parameters. The UE may map the first and second set of power control parameters to the first and second set of repetitions according to a rule. The UE may transmit the first and second sets of repetitions according to the respective RV sequences and power control parameters.

32 Claims, 17 Drawing Sheets

(51) Int. Cl.
    *H04W 72/1268* (2023.01)
    *H04W 72/23* (2023.01)

(56) References Cited

U.S. PATENT DOCUMENTS

| | | |
|---|---|---|
| 11,588,602 B2 * | 2/2023 | MolavianJazi ........ H04L 5/0048 |
| 2020/0136770 A1 * | 4/2020 | Khoshnevisan .. H04W 72/0446 |
| 2021/0029719 A1 | 1/2021 | Zhou et al. |
| 2021/0345306 A1 | 11/2021 | Takeda et al. |
| 2023/0140213 A1 * | 5/2023 | Awadin ................. H04L 5/0044 |
| | | 370/329 |
| 2024/0178939 A1 * | 5/2024 | Davydov .............. H04L 5/0094 |

OTHER PUBLICATIONS

XIAOMI: "Enhancements on Multi-TRP for PDCCH, PUCCH and PUSCH", 3GPP TSG-RAN WG1 Meeting #104-e, R1-2101093, 3rd Generation Partnership Project, Mobile Competence Centre, 650, Route Des Lucioles, F-06921 Sophia-Antipolis Cedex, France, vol. RAN WG1, No. e-Meeting, 20210125-20210205, Jan. 18, 2021, XP051970665, 19 Pages, Section 3, p. 5-p. 10.

ERICSSON: "Performance Comparison of Different RV Combinations for SDM and FDM Based Multi-TRP Schemes", 3GPP TSG RAN WG1 Meeting #96bis, R1-1905165, Xian, China, Apr. 8-12, 2019, pp. 1-3.

\* cited by examiner

PARAMETER CONFIGURATION FOR CONFIGURED GRANT BASED MULTI-TRANSMISSION RECEPTION POINT COMMUNICATIONS

CROSS REFERENCE

The present application for patent claims the benefit of U.S. Provisional Patent Application No. 63/186,868 by CHEN et al., entitled "PARAMETER CONFIGURATION FOR CONFIGURED GRANT BASED MULTITRANSMISSION RECEPTION POINT COMMUNICATIONS," filed May 11, 2021, assigned to the assignee hereof, and expressly incorporated by reference herein.

FIELD OF TECHNOLOGY

The following relates to wireless communications, including parameter configuration for configured grant based multi-transmission reception point communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Configured grant uplink communications (UL CG) are communications where the UE receives a configuration in advance for multiple UL transmissions (on a semi-persistent basis). The configurations received by the UE configure a variety of parameters so that UL transmissions may occur without dynamic grants. Among these parameters are redundancy version (RV) order and power control parameters. An RV order represents the different levels of redundancy used by the UE in transmitting repetitions of an UL CG transmission.

SUMMARY

The described techniques relate to improved methods, systems, devices, and apparatuses that support parameter configuration for configured grant based multi-transmission reception point communications. Generally, the described techniques provide for a user equipment (UE) receiving one or more control messages that schedule a first set of repetitions of an uplink transmission to a first transmission/reception point and a second set of repetitions of the uplink transmission to a second transmission/reception point. The one or more control messages may be indicative of a first redundancy version sequence that is to be applied to the first set of repetitions and a second redundancy version sequence that is to be applied to the second set of repetitions. The one or more control messages may also indicate a first set of power control parameters and a second set of power control parameters. The UE may map the first and second set of power control parameters to the first and second set of repetitions according to a mapping rule. The UE may transmit the first set of repetitions according to the first redundancy version sequence and the respective set of power control parameters. The UE may transmit the second set of repetitions according to the second redundancy version sequence and the respective set of power control parameters.

A method for wireless communications at a user equipment (UE) is described. The method may include receiving one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions, transmitting a first repetition of the first set of repetitions according to a first redundancy version value of the first redundancy version sequence, and transmitting a second repetition of the second set of repetitions according to a second redundancy version value of the second redundancy version sequence.

An apparatus for wireless communications at a UE is described. The apparatus may include a processor, memory coupled with the processor, and instructions stored in the memory. The instructions may be executable by the processor to cause the apparatus to receive one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions, transmit a first repetition of the first set of repetitions according to a first redundancy version value of the first redundancy version sequence, and transmit a second repetition of the second set of repetitions according to a second redundancy version value of the second redundancy version sequence.

Another apparatus for wireless communications at a UE is described. The apparatus may include means for receiving one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions, means for transmitting a first repetition of the first set of repetitions according to a first redundancy version value of the first redundancy version sequence, and means for transmitting a second repetition of the second set of repetitions according to a second redundancy version value of the second redundancy version sequence.

A non-transitory computer-readable medium storing code for wireless communications at a UE is described. The code may include instructions executable by a processor to receive one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions, transmit a first repetition of the first set of repetitions according to a first redundancy version value of the first redundancy version sequence, and transmit a second repetition of the second set of repetitions according to a second redundancy version value of the second redundancy version sequence.

In some examples of the method, apparatuses, and non-transitory computer-readable medium described herein, receiving the one or more control messages may include operations, features, means, or instructions for receiving, via the one or more control messages, a pair of redundancy version sequences, where the pair specifies the first redundancy version sequence and the second redundancy version sequence.

In some examples of the method, apparatuses, and non-transitory computer-readable medium described herein, receiving the one or more control messages may include operations, features, means, or instructions for receiving, via the one or more control messages, the first redundancy version sequence and an offset value, where the second redundancy version sequence may be determined based on the first redundancy version sequence and the offset value.

Some examples of the method, apparatuses, and non-transitory computer-readable medium described herein may further include operations, features, means, or instructions for determining the second redundancy version sequence by shifting each redundancy version value of the first redundancy version sequence by the offset value, the shifting being an offset value shift within the first redundancy version sequence.

Some examples of the method, apparatuses, and non-transitory computer-readable medium described herein may further include operations, features, means, or instructions for determining the second redundancy version sequence by adding the offset value to each redundancy version value of the first redundancy version sequence and applying a modulo operator with a length of the first redundancy version sequence that results in each redundancy version value of the second redundancy version sequence.

Some examples of the method, apparatuses, and non-transitory computer-readable medium described herein may further include operations, features, means, or instructions for determining a starting redundancy version sequence position of an initial repetition of the uplink transmission from among zero-value redundancy version values of both the first redundancy version sequence and the second redundancy version sequence.

Some examples of the method, apparatuses, and non-transitory computer-readable medium described herein may further include operations, features, means, or instructions for determining a starting redundancy version sequence position of an initial repetition of the uplink transmission from among zero-value redundancy version values of only the first redundancy version sequence in accordance with the first set of repetitions corresponding to a first sounding reference signal resource set.

Some examples of the method, apparatuses, and non-transitory computer-readable medium described herein may further include operations, features, means, or instructions for determining that a starting redundancy version sequence position of an initial repetition of the uplink transmission may be not a last repetition occasion of a combination of the first set of repetitions and the second set of repetitions.

In some examples of the method, apparatuses, and non-transitory computer-readable medium described herein, receiving the one or more control messages may include operations, features, means, or instructions for receiving, via the one or more control messages, a first field that indicates the first redundancy version sequence and a second field that indicates the second redundancy version sequence, where the first redundancy version sequence may be applied to the first set of repetitions and the second redundancy version sequence may be applied to the second set of repetitions based on an order of the first field and the second field.

In some examples of the method, apparatuses, and non-transitory computer-readable medium described herein, receiving the one or more control messages may include operations, features, means, or instructions for receiving a downlink control information message that indicates an order of transmission of the first set of repetitions and the second set of repetitions, where the first redundancy version sequence may be applied to the first set of repetitions and the second redundancy version sequence may be applied to the second set of repetitions based on the order of transmission.

Some examples of the method, apparatuses, and non-transitory computer-readable medium described herein may further include operations, features, means, or instructions for transmitting subsequent repetitions of the first set of repetitions using respective subsequent redundancy version values of the first redundancy version sequence and transmitting subsequent repetitions of the second set of repetitions using respective subsequent redundancy version values of the second redundancy version sequence.

A method for wireless communications at a user equipment (UE) is described. The method may include receiving one or more control messages that activate or schedule a first set of repetitions of an uplink transmission corresponding to a first transmission/reception point and a second set of repetitions of the uplink transmission corresponding to a second transmission/reception point, where the one or more control messages indicate a first redundancy version sequence and an offset value, determining a second redundancy version sequence using the offset value, each redundancy version value of the first redundancy version sequence, and a modulo operator that results in each redundancy version value of the second redundancy version sequence, transmitting a first repetition of the first set of repetitions according to a first redundancy version value of the first redundancy version sequence, and transmitting a second repetition of the second set of repetitions according to a second redundancy version value of the second redundancy version sequence.

An apparatus for wireless communications at a UE is described. The apparatus may include a processor, memory coupled with the processor, and instructions stored in the memory. The instructions may be executable by the processor to cause the apparatus to receive one or more control messages that activate or schedule a first set of repetitions of an uplink transmission corresponding to a first transmission/reception point and a second set of repetitions of the uplink transmission corresponding to a second transmission/reception point, where the one or more control messages indicate a first redundancy version sequence and an offset value, determine a second redundancy version sequence using the offset value, each redundancy version value of the first redundancy version sequence, and a modulo operator that results in each redundancy version value of the second redundancy version sequence, transmit a first repetition of the first set of repetitions according to a first redundancy version value of the first redundancy version sequence, and transmit a second repetition of the second set of repetitions according to a second redundancy version value of the second redundancy version sequence.

Another apparatus for wireless communications at a UE is described. The apparatus may include means for receiving one or more control messages that activate or schedule a first set of repetitions of an uplink transmission corresponding to a first transmission/reception point and a second set of repetitions of the uplink transmission corresponding to a second transmission/reception point, where the one or more control messages indicate a first redundancy version sequence and an offset value, means for determining a second redundancy version sequence using the offset value, each redundancy version value of the first redundancy version sequence, and a modulo operator that results in each redundancy version value of the second redundancy version sequence, means for transmitting a first repetition of the first set of repetitions according to a first redundancy version value of the first redundancy version sequence, and means for transmitting a second repetition of the second set of repetitions according to a second redundancy version value of the second redundancy version sequence.

A non-transitory computer-readable medium storing code for wireless communications at a UE is described. The code may include instructions executable by a processor to receive one or more control messages that activate or schedule a first set of repetitions of an uplink transmission corresponding to a first transmission/reception point and a second set of repetitions of the uplink transmission corresponding to a second transmission/reception point, where the one or more control messages indicate a first redundancy version sequence and an offset value, determine a second redundancy version sequence using the offset value, each redundancy version value of the first redundancy version sequence, and a modulo operator that results in each redundancy version value of the second redundancy version sequence, transmit a first repetition of the first set of repetitions according to a first redundancy version value of the first redundancy version sequence, and transmit a second repetition of the second set of repetitions according to a second redundancy version value of the second redundancy version sequence.

Some examples of the method, apparatuses, and non-transitory computer-readable medium described herein may further include operations, features, means, or instructions for determining a starting redundancy version sequence position of an initial repetition of the uplink transmission from among zero-value redundancy version values of both the first redundancy version sequence and the second redundancy version sequence.

In some examples of the method, apparatuses, and non-transitory computer-readable medium described herein, determining the second redundancy version sequence may include operations, features, means, or instructions for determining the second redundancy version sequence by adding the offset value to each redundancy version value of the first redundancy version sequence and applying the modulo operator with a length of the first redundancy version sequence or a value of four that results in each redundancy version value of the second redundancy version sequence.

Some examples of the method, apparatuses, and non-transitory computer-readable medium described herein may further include operations, features, means, or instructions for determining that a starting redundancy version sequence position of an initial repetition of the uplink transmission may be not a last repetition occasion of a combination of the first set of repetitions and the second set of repetitions.

In some examples of the method, apparatuses, and non-transitory computer-readable medium described herein, a number of configured repetitions may be greater than or equal to eight and the starting redundancy version sequence position of the initial repetition of the uplink transmission may be not the last repetition occasion based on the number of configured repetitions being greater than or equal to eight.

In some examples of the method, apparatuses, and non-transitory computer-readable medium described herein, receiving the one or more control messages may include operations, features, means, or instructions for receiving a downlink control information message that indicates an order of transmission of the first set of repetitions and the second set of repetitions, where the first redundancy version sequence may be applied to the first set of repetitions and the second redundancy version sequence may be applied to the second set of repetitions based on the order of transmission.

Some examples of the method, apparatuses, and non-transitory computer-readable medium described herein may further include operations, features, means, or instructions for transmitting subsequent repetitions of the first set of repetitions using respective subsequent redundancy version values of the first redundancy version sequence and transmitting subsequent repetitions of the second set of repetitions using respective subsequent redundancy version values of the second redundancy version sequence.

In some examples of the method, apparatuses, and non-transitory computer-readable medium described herein, one or more repetitions of the first set of repetitions and one or more repetitions of the second set of repetitions may be transmitted according to a cyclic beam mapping pattern or a sequential beam mapping pattern.

In some examples of the method, apparatuses, and non-transitory computer-readable medium described herein, the first set of repetitions may be associated with a first sounding reference signal resource set and the second set of repetitions may be associated with a second sounding reference signal resource set.

A method is described. The method may include receiving a first control message that indicates a first set of power control parameters and a second set of power control parameters, receiving a downlink control information message that schedules a first set of repetitions of an uplink transmission to a first transmission/reception point and a second set of repetitions of the uplink transmission to a second transmission/reception point, mapping respective ones of the first set of power control parameters and the second set of power control parameters to the first set of repetitions and the second set of power control parameters in accordance with a power control parameter mapping rule, and transmitting the first set of repetitions using a first transmission power and the second set of repetitions using a second transmission power, where the first transmission power and the second transmission power are determined based on the mapping of the first set of power control parameters and the second set of power control parameters.

An apparatus is described. The apparatus may include a processor, memory coupled with the processor, and instructions stored in the memory. The instructions may be executable by the processor to cause the apparatus to receive a first control message that indicates a first set of power control parameters and a second set of power control parameters, receive a downlink control information message that schedules a first set of repetitions of an uplink transmission to a first transmission/reception point and a second set of repetitions of the uplink transmission to a second transmission/reception point, map respective ones of the first set of power control parameters and the second set of power control parameters to the first set of repetitions and the second set of power control parameters in accordance with a power control parameter mapping rule, and transmit the first set of repetitions using a first transmission power and the second set of repetitions using a second transmission power, where the first transmission power and the second transmission power are determined based on the mapping of the first set of power control parameters and the second set of power control parameters.

Another apparatus is described. The apparatus may include means for receiving a first control message that indicates a first set of power control parameters and a second set of power control parameters, means for receiving a downlink control information message that schedules a first set of repetitions of an uplink transmission to a first transmission/reception point and a second set of repetitions of the uplink transmission to a second transmission/reception point, means for mapping respective ones of the first set of power control parameters and the second set of power control parameters to the first set of repetitions and the second set of power control parameters in accordance with a power control parameter mapping rule, and means for transmitting the first set of repetitions using a first transmission power and the second set of repetitions using a second transmission power, where the first transmission power and the second transmission power are determined based on the mapping of the first set of power control parameters and the second set of power control parameters.

A non-transitory computer-readable medium storing code is described. The code may include instructions executable by a processor to receive a first control message that indicates a first set of power control parameters and a second set of power control parameters, receive a downlink control information message that schedules a first set of repetitions of an uplink transmission to a first transmission/reception point and a second set of repetitions of the uplink transmission to a second transmission/reception point, map respective ones of the first set of power control parameters and the second set of power control parameters to the first set of repetitions and the second set of power control parameters in accordance with a power control parameter mapping rule, and transmit the first set of repetitions using a first transmission power and the second set of repetitions using a second transmission power, where the first transmission power and the second transmission power are determined based on the mapping of the first set of power control parameters and the second set of power control parameters.

In some examples of the method, apparatuses, and non-transitory computer-readable medium described herein, mapping the respective ones may include operations, features, means, or instructions for mapping one of the first set of power control parameters and the second set of power control parameters to the first set of repetitions in accordance with the mapping rule which specifies that a set of power control parameters having a lower identifier value may be applied to a set of repetitions corresponding to a first sounding reference signal resource set.

In some examples of the method, apparatuses, and non-transitory computer-readable medium described herein, mapping the respective ones may include operations, features, means, or instructions for mapping one of the first set of power control parameters and the second set of power control parameters to the first set of repetitions in accordance with the mapping rule which specifies that a set of power control parameters having a higher identifier value may be applied to a set of repetitions corresponding to a first sounding reference signal resource set.

In some examples of the method, apparatuses, and non-transitory computer-readable medium described herein, mapping the respective ones may include operations, features, means, or instructions for mapping one of the first set of power control parameters and the second set of power control parameters to the first set of repetitions in accordance with the mapping rule which specifies that a set of power control parameters indicated by a first field of the first control message may be applied to a set of repetitions corresponding to a first sounding reference signal resource set.

In some examples of the method, apparatuses, and non-transitory computer-readable medium described herein, mapping the respective ones may include operations, features, means, or instructions for mapping one of the first set of power control parameters and the second set of power control parameters to the first set of repetitions in accordance with the mapping rule which specifies that a set of power control parameters indicated by a second field of the first control message may be applied to a set of repetitions corresponding to a first sounding reference signal resource set.

In some examples of the method, apparatuses, and non-transitory computer-readable medium described herein, receiving the downlink control information message may include operations, features, means, or instructions for receiving the downlink control information message that indicates an order of transmission of the first set of repetitions and the second set of repetitions, where one of the first set of power control parameters and the second set of power control parameters may be mapped to the first set of repetitions in accordance with the mapping rule which specifies that a set of power control parameters may be mapped to a set of repetitions based on a identifier value of a respective power control parameter and the order of transmission.

In some examples of the method, apparatuses, and non-transitory computer-readable medium described herein, mapping the respective ones may include operations, features, means, or instructions for mapping one of the first set of power control parameters and the second set of power control parameters to each configured grant uplink transmission occasions of a set of configured grant uplink transmission occasions activated by the downlink control information message in accordance with the mapping rule.

Some examples of the method, apparatuses, and non-transitory computer-readable medium described herein may further include operations, features, means, or instructions for mapping one of the first set of power control parameters and the second set of power control parameters to the first set of repetitions of each configured grant uplink transmission occasion of the set of configured grant uplink transmission occasions in accordance with the mapping rule which specifies that a set of power control parameters indicated by a first field of the first control message may be applied to a set of repetitions corresponding to a first sounding reference signal resource set.

Some examples of the method, apparatuses, and non-transitory computer-readable medium described herein may further include operations, features, means, or instructions for mapping one of the first set of power control parameters and the second set of power control parameters to the first set of repetitions of a first configured grant uplink transmission occasion of the set of configured grant uplink transmission occasions in accordance with a dynamic switching field included in the downlink control information message, where remaining configured grant uplink transmission occasions of the set of configured grant uplink transmission occasions may be mapped according to the mapping rule which specifies that a set of power control parameters indicated by a first field of the first control message may be applied to a set of repetitions corresponding to a first sounding reference signal resource set.

In some examples of the method, apparatuses, and non-transitory computer-readable medium described herein, receiving the downlink control information message may include operations, features, means, or instructions for receiving the downlink control information message that schedules a retransmission of a prior uplink configured grant transmission, where one of the first set of power control parameters and the second set of power control parameters may be mapped to the first set of repetitions in accordance with a dynamic switching field included in the downlink control information message.

A method for wireless communications at a base station is described. The method may include transmitting one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions and receiving a repetition of the uplink transmission of the first set of repetitions or the second set of repetitions based on a redundancy version value of the first redundancy version sequence or the second redundancy version sequence.

An apparatus for wireless communications at a base station is described. The apparatus may include a processor, memory coupled with the processor, and instructions stored in the memory. The instructions may be executable by the processor to cause the apparatus to transmit one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions and receive a repetition of the uplink transmission of the first set of repetitions or the second set of repetitions based on a redundancy version value of the first redundancy version sequence or the second redundancy version sequence.

Another apparatus for wireless communications at a base station is described. The apparatus may include means for transmitting one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions and means for receiving a repetition of the uplink transmission of the first set of repetitions or the second set of repetitions based on a redundancy version value of the first redundancy version sequence or the second redundancy version sequence.

A non-transitory computer-readable medium storing code for wireless communications at a base station is described. The code may include instructions executable by a processor to transmit one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions and receive a repetition of the uplink transmission of the first set of repetitions or the second set of repetitions based on a redundancy version value of the first redundancy version sequence or the second redundancy version sequence.

In some examples of the method, apparatuses, and non-transitory computer-readable medium described herein, transmitting the one or more control messages may include operations, features, means, or instructions for transmitting, via the one or more control messages, a pair of redundancy version sequences, where the pair specifies the first redundancy version sequence and the second redundancy version sequence.

In some examples of the method, apparatuses, and non-transitory computer-readable medium described herein, transmitting the one or more control messages may include operations, features, means, or instructions for transmitting via the one or more control messages, the first redundancy version sequence and an offset value, where the second redundancy version sequence may be determined based on the first redundancy version sequence and the offset value.

In some examples of the method, apparatuses, and non-transitory computer-readable medium described herein, the second redundancy version sequence may be determined by shifting each redundancy version value of the first redundancy version sequence by the offset value, the shifting being an offset value shift within the first redundancy version sequence.

In some examples of the method, apparatuses, and non-transitory computer-readable medium described herein, the second redundancy version sequence may be determined by adding the offset value to each redundancy version value of the first redundancy version sequence and applying a modulo operator with a length of the first redundancy version sequence that results in each redundancy version value of the second redundancy version sequence.

Some examples of the method, apparatuses, and non-transitory computer-readable medium described herein may further include operations, features, means, or instructions for determining a starting redundancy version sequence position of an initial repetition of the uplink transmission from among zero-value redundancy version values of both the first redundancy version sequence and the second redundancy version sequence.

Some examples of the method, apparatuses, and non-transitory computer-readable medium described herein may further include operations, features, means, or instructions for determining a starting redundancy version sequence position of an initial repetition of the uplink transmission from among zero-value redundancy version values of only the first redundancy version sequence in accordance with the first set of repetitions corresponding to a first sounding reference signal resource set.

In some examples of the method, apparatuses, and non-transitory computer-readable medium described herein, receiving the one or more control messages may include operations, features, means, or instructions for determining that a starting redundancy version sequence position of an initial repetition of the uplink transmission may be not a last repetition occasion of a combination of the first set of repetitions and the second set of repetitions.

In some examples of the method, apparatuses, and non-transitory computer-readable medium described herein, transmitting the one or more control messages may include operations, features, means, or instructions for transmitting via the one or more control messages, a first field that indicates the first redundancy version sequence and a second field that indicates the second redundancy version sequence, where the first redundancy version sequence may be applied to the first set of repetitions and the second redundancy version sequence may be applied to the second set of repetitions based on an order of the first field and the second field.

In some examples of the method, apparatuses, and non-transitory computer-readable medium described herein, transmitting the one or more control messages may include operations, features, means, or instructions for transmitting a downlink control information messages that indicates an order of transmission of the first set of repetitions and the second set of repetitions, where the first redundancy version sequence may be applied to the first set of repetitions and the second redundancy version sequence may be applied to the second set of repetitions based on the order of transmission.

A method for wireless communications at a base station is described. The method may include transmitting a first control message that indicates a first set of power control parameters and a second set of power control parameters, transmitting a downlink control information message that schedules a first set of repetitions of an uplink transmission to a first transmission/reception point and a second set of repetitions of the uplink transmission to a second transmission/reception point, mapping respective ones of the first set of power control parameters and the second set of power control parameters to the first set of repetitions and the second set of power control parameters in accordance with a power control parameter mapping rule, and receiving a repetition of the uplink transmission using received power based on the mapping of the first set of power control parameters and the second set of power control parameters.

An apparatus for wireless communications at a base station is described. The apparatus may include a processor, memory coupled with the processor, and instructions stored in the memory. The instructions may be executable by the processor to cause the apparatus to transmit a first control message that indicates a first set of power control parameters and a second set of power control parameters, transmit a downlink control information message that schedules a first set of repetitions of an uplink transmission to a first transmission/reception point and a second set of repetitions of the uplink transmission to a second transmission/reception point, map respective ones of the first set of power control parameters and the second set of power control parameters to the first set of repetitions and the second set of power control parameters in accordance with a power control parameter mapping rule, and receive a repetition of the uplink transmission using received power based on the mapping of the first set of power control parameters and the second set of power control parameters.

Another apparatus for wireless communications at a base station is described. The apparatus may include means for transmitting a first control message that indicates a first set of power control parameters and a second set of power control parameters, means for transmitting a downlink control information message that schedules a first set of repetitions of an uplink transmission to a first transmission/reception point and a second set of repetitions of the uplink transmission to a second transmission/reception point, means for mapping respective ones of the first set of power control parameters and the second set of power control parameters to the first set of repetitions and the second set of power control parameters in accordance with a power control parameter mapping rule, and means for receiving a repetition of the uplink transmission using received power based on the mapping of the first set of power control parameters and the second set of power control parameters.

A non-transitory computer-readable medium storing code for wireless communications at a base station is described. The code may include instructions executable by a processor to transmit a first control message that indicates a first set of power control parameters and a second set of power control parameters, transmit a downlink control information message that schedules a first set of repetitions of an uplink transmission to a first transmission/reception point and a second set of repetitions of the uplink transmission to a second transmission/reception point, map respective ones of the first set of power control parameters and the second set of power control parameters to the first set of repetitions and the second set of power control parameters in accordance with a power control parameter mapping rule, and receive a repetition of the uplink transmission using received power based on the mapping of the first set of power control parameters and the second set of power control parameters.

In some examples of the method, apparatuses, and non-transitory computer-readable medium described herein, mapping the respective ones may include operations, features, means, or instructions for mapping one of the first set of power control parameters and the second set of power control parameters to the first set of repetitions in accordance with the mapping rule which specifies that a set of power control parameters having a lower identifier value may be applied to a set of repetitions corresponding to a first sounding reference signal resource set.

In some examples of the method, apparatuses, and non-transitory computer-readable medium described herein, mapping the respective ones may include operations, features, means, or instructions for mapping one of the first set of power control parameters and the second set of power control parameters to the first set of repetitions in accordance with the mapping rule which specifies that a set of power control parameters having a higher identifier value may be applied to a set of repetitions corresponding to a first sounding reference signal resource set.

In some examples of the method, apparatuses, and non-transitory computer-readable medium described herein, mapping the respective ones may include operations, features, means, or instructions for mapping one of the first set of power control parameters and the second set of power control parameters to the first set of repetitions in accordance with the mapping rule which specifies that a set of power control parameters indicated by a first field of the first control message may be applied to a set of repetitions corresponding to a first sounding reference signal resource set.

In some examples of the method, apparatuses, and non-transitory computer-readable medium described herein, mapping the respective ones may include operations, features, means, or instructions for mapping one of the first set of power control parameters and the second set of power control parameters to the first set of repetitions in accordance with the mapping rule which specifies that a set of power control parameters indicated by a second field of the first control message may be applied to a set of repetitions corresponding to a first sounding reference signal resource set.

In some examples of the method, apparatuses, and non-transitory computer-readable medium described herein, transmitting the downlink control information message may include operations, features, means, or instructions for transmitting the downlink control information message that indicates an order of transmission of the first set of repetitions and the second set of repetitions, one of the first set of power control parameters and the second set of power control parameters being mapped to the first set of repetitions in accordance with the mapping rule which specifies that a set of power control parameters may be mapped to a set of repetitions based on a identifier value of a respective power control parameter of the first set of power control parameters and the second set of power control parameters and the order of transmission.

In some examples of the method, apparatuses, and non-transitory computer-readable medium described herein, mapping the respective ones may include operations, features, means, or instructions for mapping one of the first set of power control parameters and the second set of power control parameters to each configured grant uplink transmission occasions of a set of configured grant uplink transmission occasions activated by the downlink control information message in accordance with the mapping rule.

Some examples of the method, apparatuses, and non-transitory computer-readable medium described herein may further include operations, features, means, or instructions for mapping one of the first set of power control parameters and the second set of power control parameters to the first set of repetitions of each configured grant uplink transmission occasion of the set of configured grant uplink transmission occasions in accordance with the mapping rule which specifies that a set of power control parameters indicated by a first field of the first control message may be applied to a set of repetitions corresponding to a first sounding reference signal resource set.

Some examples of the method, apparatuses, and non-transitory computer-readable medium described herein may further include operations, features, means, or instructions for mapping one of the first set of power control parameters and the second set of power control parameters to the first set of repetitions of a first configured grant uplink transmission occasion of the set of configured grant uplink transmission occasions in accordance with a dynamic switching field included in the downlink control information message, where remaining configured grant occasions of the set of configured grant uplink transmission occasions may be mapped according to the mapping rule which specifies that a set of power control parameters indicated by a first field of the first control message may be applied to a set of repetitions corresponding to a first sounding reference signal resource set.

In some examples of the method, apparatuses, and non-transitory computer-readable medium described herein, transmitting the downlink control information message may include operations, features, means, or instructions for transmitting the downlink control information message that schedules a retransmission of a prior uplink configured grant transmission, where one of the first set of power control parameters and the second set of power control parameters may be mapped to the first set of repetitions in accordance with a dynamic switching field included in the downlink control information message.

DETAILED DESCRIPTION

Figure 1:
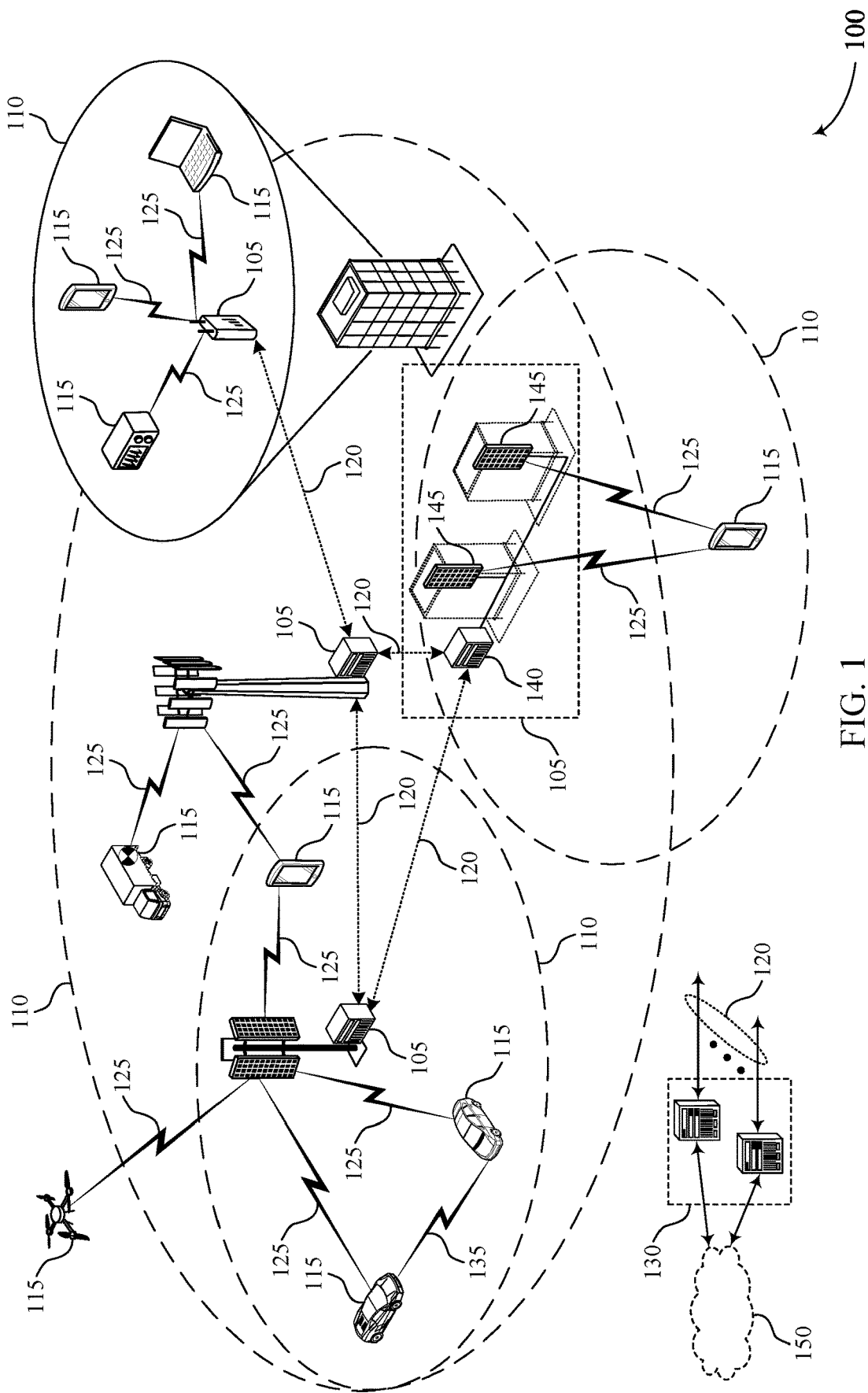
FIG. 1 illustrates an example of a wireless communications system that supports parameter configuration for configured grant based multi-transmission reception point communications in accordance with aspects of the present disclosure.

Configured grant uplink communications (UL CG) are communications where the UE receives a configuration in advance for multiple UL transmissions (on a semi-persistent basis). The configurations received by the UE configure a variety of parameters so that UL transmissions may occur without dynamic grants. Among these parameters are redundancy version (RV) value order and power control parameters. An RV value order represents the different levels of redundancy used by the UE in transmitting repetitions of an UL CG transmission. Power control parameters are used to determine transmission powers of an UL CG transmission.

Wireless communications systems may also support channel repetitions of various channels in order to improve communication reliability, among other benefits. For example, a user equipment (UE) may be configured to repeat an uplink data or control channel transmission in order to increase the likelihood of successful receipt at a base station. Various repetition configurations may be supported for various channels. In some cases, channel repetitions may be configured into two or more different sets, where each set is to be transmitted according to a respective set of transmission parameters. In some cases, a transmission parameter corresponds to a transmit beam, and as such, each set of repetitions may be transmitted using a different transmit beam. Using different transmit beams may support increased likelihood of reception and decoding of a channel at a receiving device, such as a base station, with multiple transmission-reception points (TRPs). For example, a wireless communications system may support repetitions of an uplink transmission according to a UL CG configuration.

Techniques described herein support determining various parameters and applications of various rules to two different sets of UL CG repetitions. For example, a UE may be configured with a pair of RV sequences such that each sequence of the pair is to be applied to a corresponding set of repetitions. Each sequence may be signaled to the UE explicitly (as a pair of sequences). Alternatively, one sequence may be signaled with an offset value. The offset value is used to determine the second sequence (e.g., using a shift or modulo operation). Additionally, a starting position of the initial transmission of the repetitions may be determined based on a transmission occasion corresponding to a zero-value RV of one or both sequences.

Further techniques described herein support mapping first and second sets of power control parameters (configured at the UE) to the first and second set of transmissions using various techniques. To determine the mapping order, the UE may consider the lower or higher identifier values of the power control parameters, the order of configuration of the parameters, the configured repetition set transmission order, whether the downlink control information (DCI) is an activation DCI, or some combination of these considerations. These and other techniques are described in further detail with respect to the following figures.

Aspects of the disclosure are initially described in the context of wireless communications systems. Aspects of the disclosure are further described in the context of a wireless communications system illustrating transmission repetition in UL CGs, a set of repetition mapping configurations, and a process flow diagram. Aspects of the disclosure are further illustrated by and described with reference to apparatus diagrams, system diagrams, and flowcharts that relate to parameter configuration for CG based multi-transmission reception point communications.

FIG. 1 illustrates an example of a wireless communications system 100 that supports parameter configuration for CG based multi-transmission reception point communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support UL CG transmissions, where the UE 115 receives a configuration (e.g., from a base station 105) in advance for multiple UL transmissions (e.g., on a semi-persistent basis). Further, the wireless communications system 100 may support repetitions of communication channels, such as an uplink control channel or uplink shared channel. In some examples, an UL CG transmission may be a repetition of a physical uplink shared channel (PUSCH). In some cases, the repetitions are configured into two sets, where each is transmitted according to different transmission parameters (e.g., a different beam) but may include the same content or data (e.g., PUSCH data). These techniques may improve the reliability and robustness for a transmission in multi-TRP or multi-panel scenarios (e.g., multi-TRPs configured at one or more base stations 105). For example, if one link is blocked, another repetition may be decoded by the other TRP/panel, thus increasing the likelihood that the PUSCH is received at a base station.

Techniques described herein support assigning various parameters and application of various rules to two different sets of UL CG repetitions. For example, a UE 115 may be configured, by a base station 105, with two sets of parameters that are to be assigned to a respective set of UL CG repetitions. The two sets of parameters may include RV sequences, power control parameters, or a combination thereof. To configure the UE with the two sets of RV sequences, a base station 105 may explicitly indicate two RV sequences (as a pair) or indicate one RV sequence with an indication of an offset value that is to be used by the UE 115 for determining the other RV sequence. Each set of uplink transmissions may be transmitted according to a respective RV sequence of the pair. Further, the UE 115 may use one or both RV sequences to determine a starting position of the initial transmission of the uplink transmission.

The UE 115 may be configured with two sets of power control parameters, where each set of power control parameters is to be mapped to a respective set of uplink transmissions. The UE 115 may consider an identifier value, a configuration order, a configured repetition set transmission order, DCI type that activates the transmissions, or some combination thereof, in order to map the sets of power control parameters to the respective set of uplink transmissions. Thus, using these techniques, the UE 115 may improve communication reliability of a wireless communications system by applying parameters to respective transmission sets, which may improve transmission diversity resulting in an increased probability of successful transmission.

Figure 2:
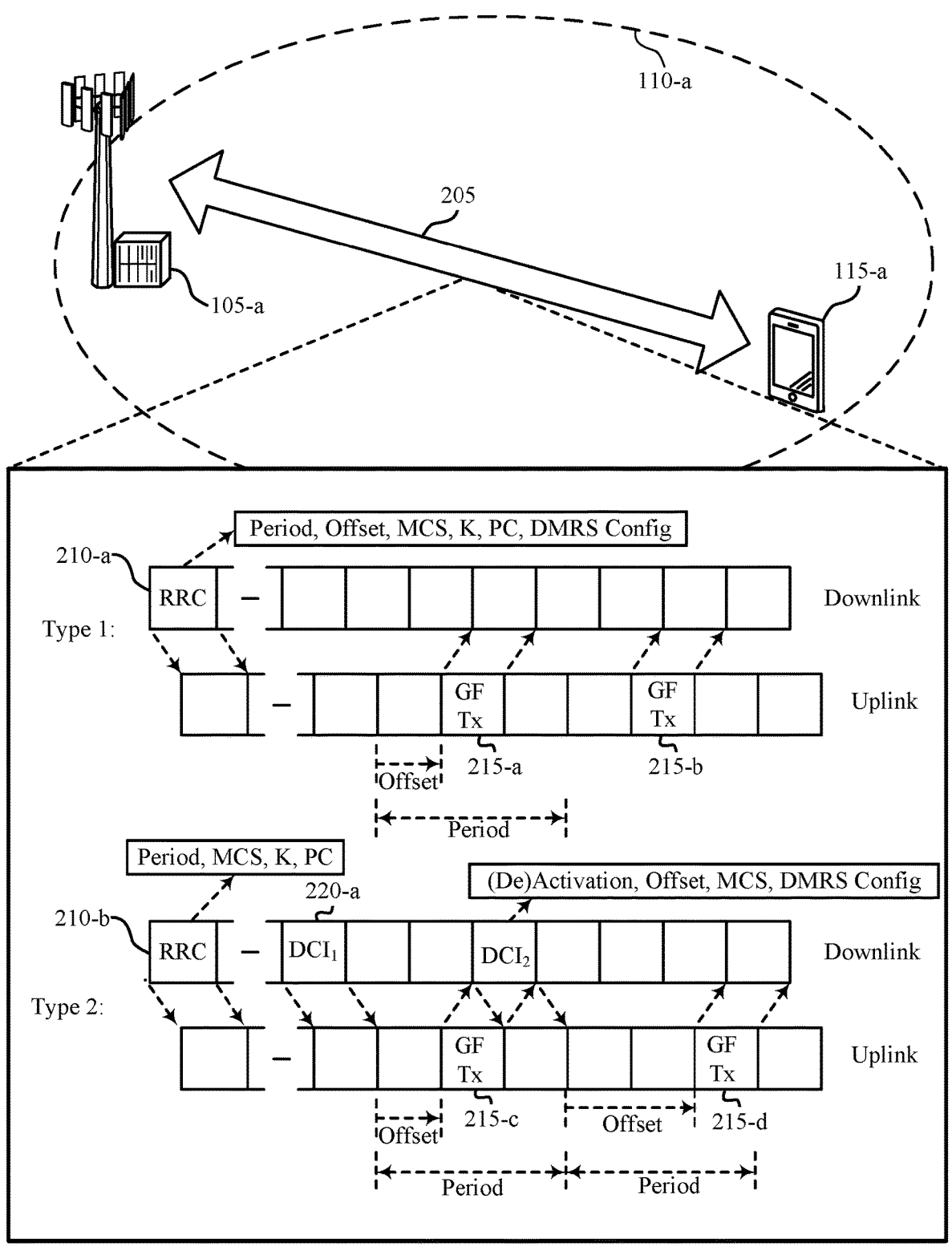
FIG. 2 illustrates an example of a wireless communications system that supports parameter configuration for configured grant based multi-transmission reception point communications in accordance with aspects of the present disclosure.

FIG. 2 illustrates an example of a wireless communications system 200 that supports parameter configuration for CG based multi-transmission reception point communications in accordance with aspects of the present disclosure. The wireless communications system 200 may implement aspects of wireless communications system 100. For example, the wireless communications system 200 includes a base station 105-a and a UE 115-a, which may be examples of the corresponding devices of FIG. 1. FIG. 2 illustrates examples of communications 205 between the base station 105-a and the UE 115-a, which may be positioned in coverage area 110-a of the base station 105-a.

As illustrated by communications 205, the wireless communications system 200 may support UL CG communications. Two types of UL CG communications are illustrated. According to UL CG type 1, the UL communication is activated and configured via one or more control messages, such as an RRC message 210-a. The RRC message 210-a may include indications of power control (PC) parameters, a period, a number of repetitions (K), a offset, a modulation and coding scheme, a demodulation reference signal configuration, among other configuration parameters. The RRC message 210-a may activate the UL CG transmissions (grant free (GF) transmissions 215-a and 215-b), and another RRC message may deactivate the grant (e.g., unconfigure the grant).

According to UL CG type 2, the grant is DCI activated upon receipt of an activation DCI (e.g., DCI message 220-a). The transmission parameters may be configured via one or more control messages such as RRC and DCI messaging. For example, an RRC message 210-b may indicate some parameters, such as power control (PC) parameters, a period, a modulating and coding scheme, a number of repetitions (K), while the activation DCI message 220-a may indicate other parameters, such as one or more sounding reference signal resource indicators (SRIs), and one or more transmit precoding matrix indexes (TPMIs). The granted is deactivated using a deactivation DCI, which may include an offset value, a modulation and coding scheme, and a demodulation reference signal configuration. The DCI message 220-a may activate GF transmissions 215-c and 215-d.

As described herein, each GF transmission 215 may correspond to one or more sets of repetitions. For an initial transmission of a PUSCH in a GF transmission 215 for UL CG type 1 or type 2, the UE 115-a may be configured with repK and repK-RV, where repK is the number of repetitions {1, 2, 4, 8} and repK-RV is the RV sequence {0231, 0303, 0000}. The RV sequence may be configured when repK>1. The $n^{th}$ transmission occasion uses the $(mod(n-1,4)+1)^{th}$ value in the RV sequence, effectively causing the UE 115 to cycle to the next value in the sequence for each subsequent transmission occasion. In some cases, the first transmission may start at an occasion corresponding to an RV of 0. As such, the first transmission may start at the first transmission occasion of K repetitions if the configured RV sequence is {0, 2, 3, 1}. Further, the first transmission may start at any of the transmission occasions if the K repetitions that are associated with RV=0 if the configured RV sequence is {0, 3, 0, 3}. Yet further, the first transmission may start at any of the transmission/repetition occasions of the K repetitions if the configured RV sequence is {0, 0, 0, 0}, except the last transmission/repetition occasion when K=8. If starting-FromRV0 is set to 'off', the initial transmission of a transport block may only start at the first transmission occasion of the repetitions (for PUSCH repetition type A) or the actual repetitions (for PUSCH repetition type B).

In some cases, a repetition is not transmitted if the repetition would have crossed a slot boundary or if it would fall in a downlink slot or a slot with uplink and downlink resources separated in the frequency domain (e.g., an S slot).

According to some configurations, the repetitions are across slots and are terminated after K repetitions if the repetitions would have crossed into the UL CG period, or if canceled by a dynamic grant.

As described herein, to improve the reliability and robustness for uplink (e.g. control channel or PUSCH) repetitions, the repetitions may be transmitted in two different sets. Each set may be transmitted according to a different set of transmission parameters (e.g., beams). This technique may be useful in a multi-TRP and/or multi-panel scenario. That is, if the base station 105-$b$ is configured with multiple TRPs or panels, then increasing the diversity of transmissions, by using two different sets of repetitions, may improve communication reliability. For UL CG, repetitions of a transport block may be transmitted towards the multiple TRPs of the base station 105-$a$ on multiple PUSCH transmission occasions of a single CG configuration.

To configure parameters, such as power control parameters, second fields may be used to configure the second sets of parameters. For example, the second fields of p0-PUSCH-Alpha and powerControlLoopToUse may be configured in ConfiguredGrantConfig. Further, for type 1 CG based multi-TRP PUSCH repetition, the second fields of pathlossReferenceIndex, srs-ResourceIndicator, and precodingAndNumberOfLayers may be configured in rrc-ConfiguredUplinkGrant. For type 2 CG based multi-TRP PUSCH repetition, two seSRIs/TPMIs may be indicated via the activating DCI. For beam configuration, the two sets of repetitions may correspond to two sounding reference signal (SRS) resource sets. Thus, the DCI may indicate two beams and two sets of power control parameters by indicating one or more SRS resources with each of the two SRS resource sets.

Techniques described herein support determination of RV sequences, initial transmission start positions, and power control parameters for CG based multi-TRP PUSCH repetitions. To configure two RV sequences for the two sets of repetitions, the base station 105-$a$ may transmit one or more control messages to the UE 115-$a$. The control messages (e.g., an RRC message 210 and/or DCI message 220)) may be indicative of a first redundancy version sequence (that is to be applied to the first set of repetitions and a second redundancy version sequence that is to be applied to the second set of repetitions. Further, the UE 115-$a$ may use the configured sequences to determine a starting position of an initial repetition from among zero-value redundancy version values of one or both redundancy version sequences configured at the UE 115-$a$. Further, the base station 105-$a$ may transmit a control message (e.g., an RRC message 210 and/or DCI message 220) that configures two sets of power control parameters at the UE 115-$a$. The UE 115-$a$ may use a mapping rule to determine which set of power control parameters are to be used for transmitting which set of repetitions. These techniques are described in further detail with respect to FIGS. 3 and 4.

Figure 3:
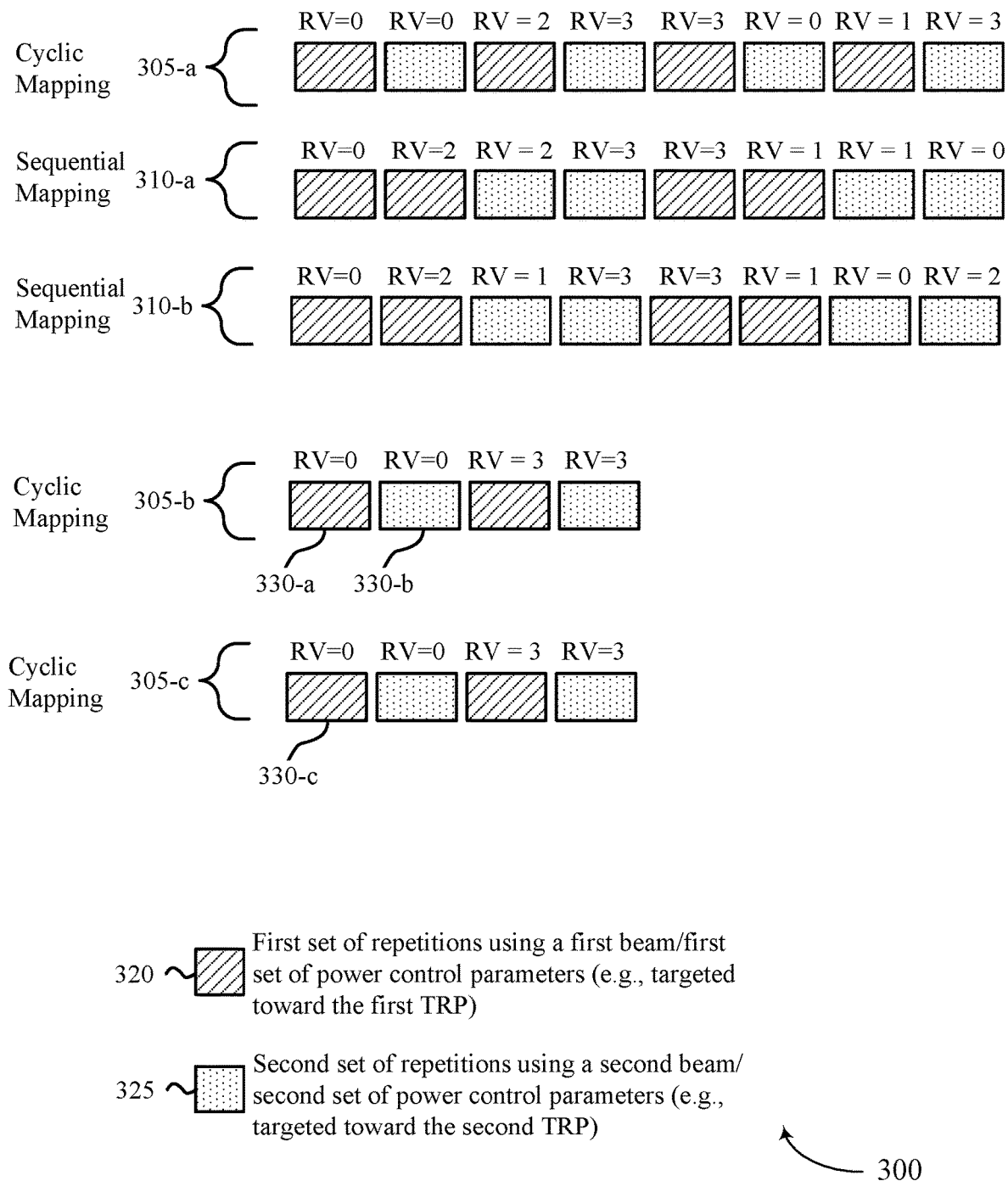
FIG. 3 illustrates an example of repetition patterns that support parameter configuration for configured grant based multi-transmission reception point communications in accordance with aspects of the present disclosure.

FIG. 3 illustrates examples of repetition patterns 300 that support parameter configuration for CG based multi-transmission reception point communications in accordance with aspects of the present disclosure. The repetition patterns 300 may be implemented by aspects of wireless communications systems 100 and 200 as described with respect to FIGS. 1 and 2. For example, a UE 115 may be configured, by a base station 105, to transmit first and second sets of repetitions of an uplink transmission. The UE 115 may transmit the first and second sets of repetitions of the uplink transmission according to one of the repetition patterns 300 of FIG. 3, which may also be configured by a base station 105. The mapping pattern may be an example of a cyclic mapping pattern 305, where one repetition of one set is followed by a repetition of the other set, and this technique is repeated for the remaining repetitions. The mapping pattern may also be an example of a sequential mapping pattern 310, where consecutive (e.g., two) repetitions of one set is followed by consecutive (e.g., two) repetitions of the other set, and this technique is repeated for the remaining repetitions. Additionally, the UE 115 may be configured, by the station 105, with an RV sequence for each set of repetitions using techniques described herein.

For configuring RV sequences in UL CG type 1 and type 2, the base station 105 may configure the UE 115-$a$ with a RV sequence pair from the list: {(0231, 0231), (0231, 0000), (0000, 0231), (0231, 0303), (0303,0231), (0303,0303), (0303, 0000), (0000, 0303), (0000, 0000)} in an RRC message (e.g., RRC messages 210 of FIG. 2). A pair may be configured when the number of repetitions K is greater than 1. Thus, as illustrated in cyclic mapping pattern 305-$a$, the UE 115 is configured with the RV sequence pair (0231, 0303), and the first RV sequence of the pair (0231) is mapped to the first set of repetitions 320 in order, and the second RV sequence of the pair (0303) is mapped to the second set of repetitions 325 in order.

Another technique configures a pair of sequences at the UE 115-$a$ by indicating a sequence (e.g., from {0231, 0303, 0000}) and an offset value (Δ). The offset and the first sequence may be used to determine the second sequence. According to one example, the offset value is interpreted as a shift in the configured sequence. For example, if Δ=1 and the indicated RV sequence is 0231, the second sequence may be determined as 2310 by shifting each value of the first sequence by the offset value (1). The shift may apply when the configured RV sequence is not 0000. Thus, as illustrated in sequential mapping pattern 310-$a$, the UE 115 is configured with the RV sequence of 0231 and an offset value of 1. The UE 115 determines the second RV sequence as 2310 using the shifting technique. The RV sequences are mapped to the first set of repetitions 320 and the second set of repetitions 325.

According to another technique, the offset may be used in a modulo operation with the configured RV sequence to determine the second sequence. For example, if Δ=1 and RV sequence 0231 is configured, the second RV sequence is (0231+1) mod 4=1302. Thus, the offset is added to each value of the sequence, and each value is used in a modulo 4 operation (e.g., four is the length of the sequence), which results in the value for the second sequence. As illustrated in sequential mapping pattern 310-$b$, the UE is configured with the RV sequence 0231 and the offset value of 1. The UE 115 determines the second sequence as 1302 using the first sequence and the offset according to the modulo technique. The RV sequences are mapped to the first set of repetitions 320 and the second set of repetitions 325.

The UE 115 may use various rules to determine which sequence is to be used with which set of transmissions. In one example, the first indicated sequence (e.g., first of a pair, or the sequence that is indicated in conjunction with the offset) is to be used for the first set of repetitions and the second sequence (e.g., second indicated or determined based on the offset) is to be used with the second set of repetitions. Further, the UE 115 may use a DCI dynamic switching field (discussed below) to change these mappings (e.g., second sequence is mapped to the first set of repetitions 320 and the first sequence is mapped to the second set of repetitions 325 based on a value of the DCI dynamic switching field).

To determine the start position of the initial transmission (i.e. a starting redundancy version sequence position) of either the first set of repetitions or the second set of repetitions, the first transmission may start at any occasion of the RV sequences corresponding to RV0, and the occasions of both sets of PUSCH repetitions may be considered. Thus, using this technique at cyclic mapping pattern 305-b, the UE 115 may start an initial transmission at position 330-a or 330-b, since both of these positions map to zero-value redundancy version values of either sequence. According to another option, the first transmission may start at an occasion corresponding to RV0 of the occasions of the first set of PUSCH repetitions corresponding to the first SRS resource set (e.g., associated with a first beam, first set of power control parameters). Thus, if the first set of repetitions are configured with a first SRS resource set, then the RV sequence corresponding to the first set of repetitions are considered for determining the starting position (e.g., based on an occasion associated with RV0 of the sequence). Using this technique at cyclic mapping pattern 305-c, the UE may start an initial transmission at position 330-c, since this position maps to an RV0 value of the first set of repetitions 320 that correspond to the first SRS resource set (first set of beams).

For power control parameters of multi-TRP PUSCH repetitions in UL CG type 2, when the DCI activates the CG PUSCH repetitions, the power control parameters may be mapped to the sets of repetitions using a mapping rule. In some cases, the applied mapping rule may be dependent on whether dynamic order switching is supported. Dynamic order switching may refer to a technique in which the order of repetitions may be dynamically (e.g., DCI) configured. That is, whether a repetition of the first set corresponding to the first SRS set is transmitted before a repetition of the second set corresponding to the second SRS set, or vice versa, may depend on the DCI dynamic switching field. One technique considers the parameter P0-PUSCH-AlphaSetId, which may apply to P0-PUSCH-Alpha. For example, the mapping rule may be that the P0-PUSCH-Alpha with a lower ID corresponds to the first SRS resource set, and the P0-PUSCH-Alpha with a higher ID corresponds to the second SRS resource set. Another mapping rule may be that the P0-PUSCH-Alpha with a higher ID corresponds to the first SRS resource set, and the P0-PUSCH-Alpha with a lower ID corresponds to the second SRS resource set. Thus, the parameters may be mapped to respective repetition sets based on the P0-PUSCH-AlphaSetId value of one parameter set relative to the value of the second parameter set.

Other mapping rules for mapping power control parameters to first and second PUSCH repetition sets (e.g., type 2 PUSCH repetitions) may depend on the order of parameters in the RRC configuration. For example, according to a mapping rule, the first field (legacy field) of P0-PUSCH-Alpha indicated by RRC message 210-b corresponds to the first set of repetitions (e.g., corresponding to the first SRS resource set) and the second field (new introduced field) of P0-PUSCH-Alpha indicated by RRC message 210-b corresponds to the second set of repetitions (e.g., corresponding to the second SRS resource set). As another example, according to a mapping rule, the first field (legacy field) of P0-PUSCH-Alpha corresponds to the second set of repetitions (e.g., corresponding to the second SRS resource set) and the second field (new introduced field) of P0-PUSCH-Alpha corresponds to the first set of repetitions (e.g., corresponding to the first SRS resource set).

The following table 1 assumes that the mapping rule that P0-PUSCH-Alpha with a lower ID corresponds to the first SRS resource set, and the P0-PUSCH-Alpha with a higher ID corresponds to the second SRS resource set:

TABLE 1

| DCI Code Point | Order | Parameter Configuration Details |
|---|---|---|
| 0 | 1 | P0-PUSCH-Alpha with a lower ID –> 1st SRS resource set |
| 1 | 2 | P0-PUSCH-Alpha with a higher ID –> 2nd SRS resource set |
| 2 | 1, 2 | P0-PUSCH-Alpha with a lower ID –> 1st SRS resource set, P0-PUSCH-Alpha with a higher ID –> 2nd SRS resource set |

In cases where dynamic order switching is supported, then the UE 115-a may apply a mapping rule that is dependent on the order configured in the DCI as well as a mapping rule. For example, the above mapping rules related to P0-PUSCH-AlphaSetId or the order of RRC parameter configuration may be used in conjunction with the DCI indicated transmission order (e.g., whether the first transmission of the first set or the second set is to be transmitted first). The following table 2 assumes the mapping rule is that P0-PUSCH-Alpha with a lower ID corresponds to the first SRS resource set, and the P0-PUSCH-Alpha with a higher ID corresponds to the second SRS resource set:

TABLE 2

| DCI Code Point | Order | Parameter Configuration Details |
|---|---|---|
| 0 | 1 | P0-PUSCH-Alpha with a lower ID –> 1st SRS resource set |
| 1 | 2 | P0-PUSCH-Alpha with a higher ID –> 2nd SRS resource set |
| 2 | 1, 2 | P0-PUSCH-Alpha with a lower ID –> 1st SRS resource set, P0-PUSCH-Alpha with a higher ID –> 2nd SRS resource set |
| 3 | 2, 1 | P0-PUSCH-Alpha with a higher ID –> 1st SRS resource set, P0-PUSCH-Alpha with a lower ID –> 2nd SRS resource set |

Thus, the mapping rule corresponds to which set is transmitted first. In the last row of table 2, the DCI codepoint indicates that the order is to be switched (e.g., second set followed by the first). Thus, the mapping rule maps the P0-PUSCH-Alpha with a lower ID to the second transmitted set of repetitions. As mentioned, the other mapping rules discussed above may be similarly used in conjunction with the transmission order indicated via DCI.

According to another mapping rule, the UE 115 may determine that the first set of repetitions 320 (and the first fields of p0-PUSCH-Alpha and powerControlLoopToUse) is to be associated with the first SRS resource set, and the second set of repetitions 325 (and the second fields of p0-PUSCH-Alpha and powerControlLoopToUse) is to be associated with the second SRS resource sets when the second fields of p0-PUSCH-Alpha and powerControlLoopToUse are RRC configured for a CG configuration. As such, the DCI field for dynamic switching is not applicable or is ignored in the activation DCI, but may be used for dynamic grants. However, the DCI field may be used in a mapping rule, dependent on the configuration. For example, the UE 115 may ignore the DCI dynamic switching field for each configured grant occasion except for the first CG occasion after receipt of an activation DCI. In this example, the remaining UL CG occasions (after the first UL CG occasion)

are scheduled without a corresponding physical downlink control channel (PDCCH), and the first UL CG occasion is assumed to be scheduled with the PDCCH. As such, for the first UL CG occasion after the CG activation, as well as for a PUSCH scheduled by the DCI corresponding to a retransmission of an UL CG (e.g., scrambled with CS-RNTI with an new data indicator (NDI)=1), the UE 115 may follow the DCI field regarding dynamic switching.

Further, the UE 115 may not use the DCI field for each CG PUSCH occasion after the activation. As such, for the DCI that is CRC scrambled with CS-RNTI and NDI=0 (activation), the DCI field may not be used, where NDI is the new data indicator field. However, for a PUSCH scheduled by DCI corresponding to a retransmission of an UL CG (CS-RNTI with NDI=1), the UE may use the DCI field regarding dynamic switching. In some cases, the DCI field for retransmission of an UL CG is not used. As such, for a DCI that is CRC scrambled with CS-RNTI and NDI=0 (activation) or NDI=1 (scheduling retransmission), the new DCI field may not be used. In these examples of when the DCI field is not used, the result is that whether to have two sets of repetitions (for multiple TRPs) or not depends on RRC configurations of the second fields of p0-PUSCH-Alpha and powerControlLoopToUse per the CG configuration.

Figure 4:
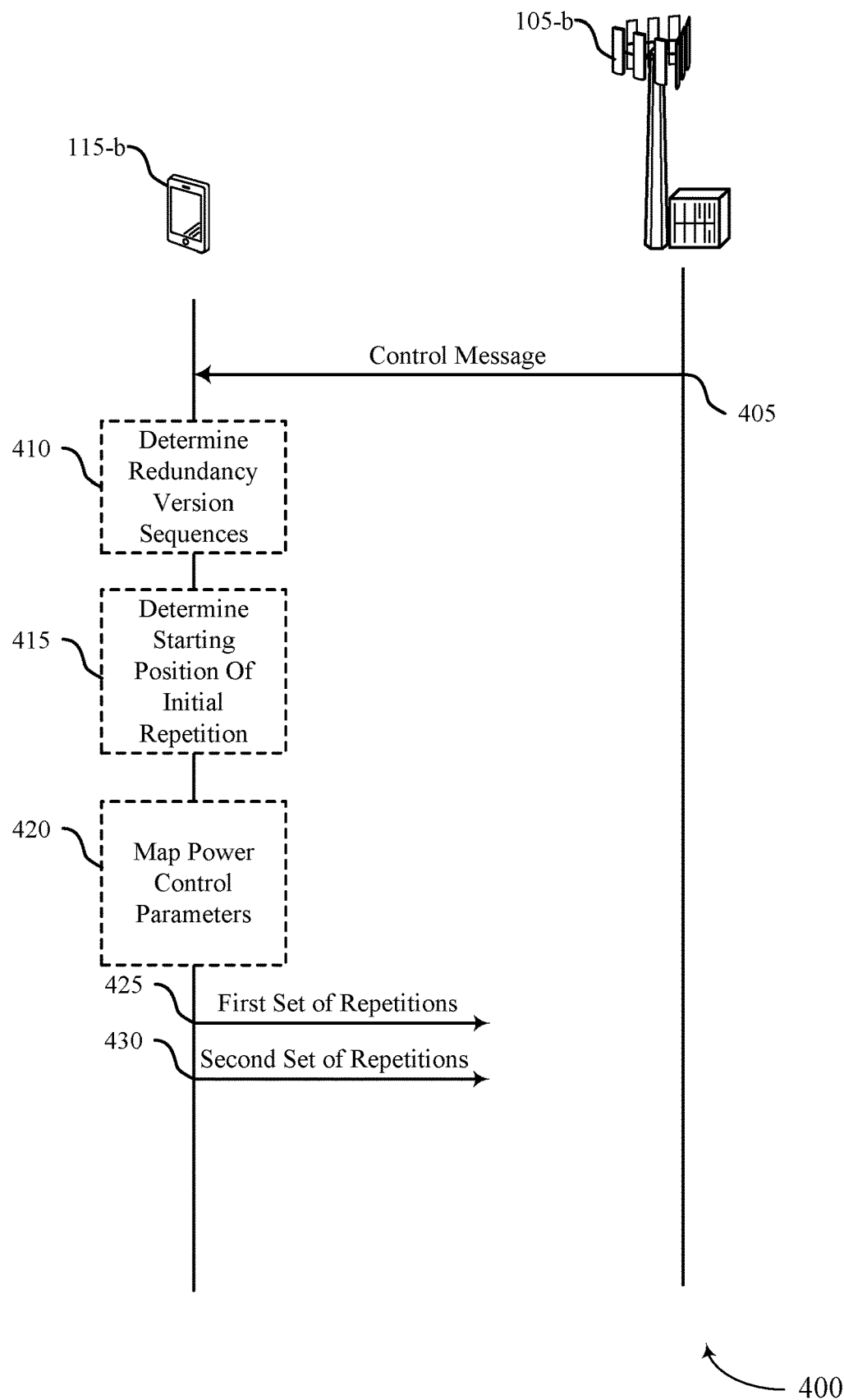
FIG. 4 illustrates an example of a process flow that supports parameter configuration for configured grant based multi-transmission reception point communications in accordance with aspects of the present disclosure.

FIG. 4 illustrates an example of a process flow 400 that supports parameter configuration for CG based multi-transmission reception point communications in accordance with aspects of the present disclosure. The process flow 400 may implement or be implemented by aspects of the wireless communications systems 100 or 200. For example, process flow 400 may be implemented by UEs 115-*b* and base station 105-*b*, which may each represent an example of the devices described with reference to FIGS. 1 through 3. Process flow 400 may be implemented by UEs 115-*b* and base station 105-*b*, for example, to support parameter mapping for uplink transmission repetition, as described with reference to FIGS. 1 through 3.

In the following description of the process flow 400, the operations may be performed in a different order than the order shown, or the operations performed by UE 115-*b* and base station 105-*b* may be performed in different orders or at different times. For example, specific operations may also be left out of the process flow 400, or other operations may be added to the process flow 400. Although UE 115-*b* and base station 105-*b* are shown performing the operations of the process flow 400, some aspects of some operations may also be performed by one or more other devices.

At 405, the UE 115-*b* may receive one or more control messages scheduling a first set of repetitions of an uplink transmission corresponding to a first transmission/reception point and a second set of repetitions of the uplink transmission corresponding to second transmission/reception point. The first and second transmission/reception points may be located at base station 105-*b* or on separate base stations. The one or more control messages may be indicative of a first redundancy version sequence that is to be applied to the first set of repetitions and a second redundancy version sequence that is to be applied to the second set of repetitions. For example, the one or more control messages may be indicative of a first redundancy version sequence and an offset value (a single control message, such as an RRC message, may indicate the first redundancy version sequence and an offset value). The one or more control messages may comprise one or more RRC message (e.g., RRC message 210-*a* or 210-*b*), one or more DCI messages (e.g., a DCI message 220), or combination thereof. In some cases, the one or more control messages include a first control message that indicates a first set of power control parameters and a second set of power control parameters. The one or more control messages may include a DCI message that schedules a first set of repetitions of an uplink transmission to a first transmission/reception point and a second set of repetitions of the uplink transmission to a second transmission/reception point.

At 410, the UE 115-*b* may determine the first and second RV sequences. In some cases, the one or more control messages include an explicit indication of a pair (e.g., one control message indicates the pair) of RV sequences that are to be applied to the first and second set of repetitions. In other cases, the one or more control messages may indicate one of the sequences and an offset value that is used by the UE 115-*b* to determine the second RV sequence. For example, the UE 115-*a* may shift the indicated RV sequence by the offset value to determine the second RV sequence or may use a modulo operation with the offset value to determine the second RV sequence. In some examples, the UE 115-*b* applies the RV sequences to the respective set of transmissions based on the order of indication of the RV sequence (e.g., first indicated RV sequence is applied to the first set of repetitions, or vice versa). In some examples, the UE 115-*b* may consider a DCI dynamic switching indication field to determine the application order of the RV sequences.

At 415, the UE 115-*b* may determine a starting position of an initial repetition of the first or second set of repetitions. In some cases, the UE 115-*b* may determine a starting RV sequence position of an initial repetition of the uplink transmission from among zero-value RV values of only the first RV sequence in accordance with the first set of repetitions corresponding to a first sounding reference signal resource set. In other cases, the UE 115-*b* may determine a starting redundancy version sequence position of an initial repetition of the uplink transmission from among zero-value redundancy version values of both the first redundancy version sequence and the second redundancy version sequence.

At 420, the UE 115-*b* may map respective ones of the first set of power control parameters and the second set of power control parameters to the first set of repetitions and the second set of repetitions in accordance with a power control parameter mapping rule. The power control parameter mapping rule may be that the UE 115-*b* is to consider an identifier value (P0-PUSCH-AlphaSetId) of the power control parameters. The mapping rule may be that the UE is to consider an order of RRC configuration (e.g., that a set of power control parameters indicated by a first field of the first control message is to be applied to a set of repetitions corresponding to a first sounding reference signal resource set). The mapping rule may also indicate that the UE 115-*b* is to consider a dynamic switching order indicated in an activation DCI. In some cases, the dynamic switching order is considered for the first set of repetitions for a set of UL CG occasions or in a retransmission of a UL CG.

At 425, the UE 115-*b* may transmit a first repetition of the first set of repetitions according to a first redundancy version value of the first redundancy version sequence. The first repetition may be transmitted to a first TRP based on the configurations for the first set of repetitions. At 430, the UE 115-*b* may transmit a second repetition of the second set of repetitions according to a second redundancy version value of the second redundancy version sequence. The second repetition may be transmitted to a second TP based on the configurations for the second set of repetitions. The first TRP and the second TRP may part of the base station 105-*b* or may be at different base stations. The UE 115-*b* may also transmit the first and second set of repetitions according to a determined starting position, using mapped power control parameters, etc.

Figure 5:
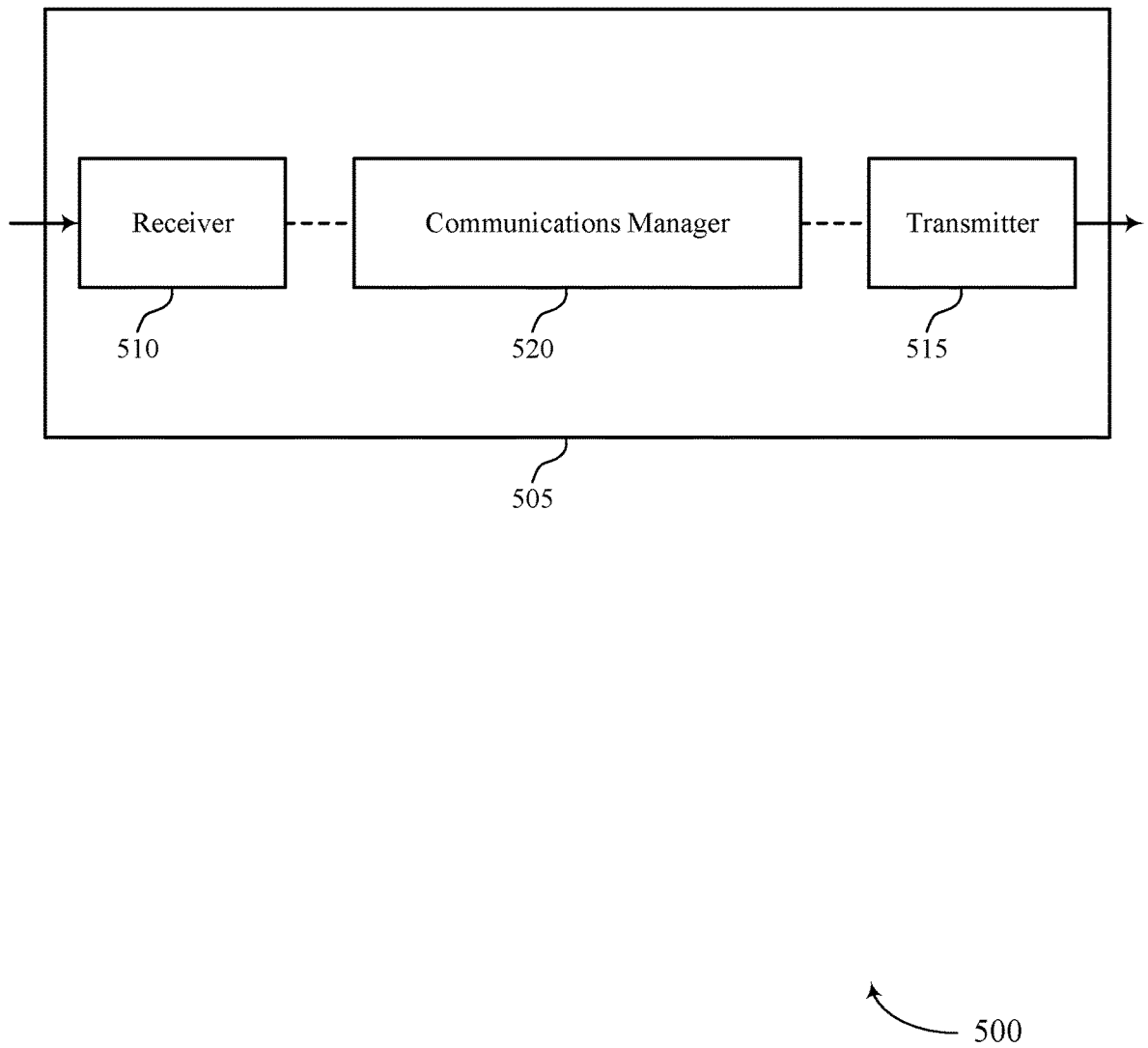
FIGS. 5 and 6 show block diagrams of devices that support parameter configuration for configured grant based multi-transmission reception point communications in accordance with aspects of the present disclosure.

FIG. 5 shows a block diagram 500 of a device 505 that supports parameter configuration for CG based multi-transmission reception point communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to parameter configuration for CG based multi-transmission reception point communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to parameter configuration for CG based multi-transmission reception point communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of parameter configuration for CG based multi-transmission reception point communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions. The communications manager 520 may be configured as or otherwise support a means for transmitting a first repetition of the first set of repetitions according to a first redundancy version value of the first redundancy version sequence. The communications manager 520 may be configured as or otherwise support a means for transmitting a second repetition of the second set of repetitions according to a second redundancy version value of the second redundancy version sequence.

For example, the communications manager 520 may be configured as or otherwise support a means for receiving one or more control messages that activate or schedule a first set of repetitions of an uplink transmission corresponding to a first transmission/reception point and a second set of repetitions of the uplink transmission corresponding to a second transmission/reception point, where the one or more control messages indicate a first redundancy version sequence and an offset value. The communications manager 520 may be configured as or otherwise support a means for determining a second redundancy version sequence using the offset value, each redundancy version value of the first redundancy version sequence, and a modulo operator that results in each redundancy version value of the second redundancy version sequence. The communications manager 520 may be configured as or otherwise support a means for transmitting a first repetition of the first set of repetitions according to a first redundancy version value of the first redundancy version sequence and transmitting a second repetition of the second set of repetitions according to a second redundancy version value of the second redundancy version sequence.

For example, the communications manager 520 may be configured as or otherwise support a means for receiving a first control message that indicates a first set of power control parameters and a second set of power control parameters. The communications manager 520 may be configured as or otherwise support a means for receiving a downlink control information message that schedules a first set of repetitions of an uplink transmission to a first transmission/reception point and a second set of repetitions of the uplink transmission to a second transmission/reception point. The communications manager 520 may be configured as or otherwise support a means for mapping respective ones of the first set of power control parameters and the second set of power control parameters to the first set of repetitions and the second set of power control parameters in accordance with a power control parameter mapping rule. The communications manager 520 may be configured as or otherwise support a means for transmitting the first set of repetitions using a first transmission power and the second set of repetitions using a second transmission power, where the first transmission power and the second transmission power are determined based on the mapping of the first set of power control parameters and the second set of power control parameters.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources by configuring RV sequences for decoding as well as reduced power consumption by configuring the power control parameters for uplink repetition sets. Additionally, the resources are more efficiently used by supporting increasing likelihood of successful transmission based on the repetition sets supported by the techniques.

Figure 6:
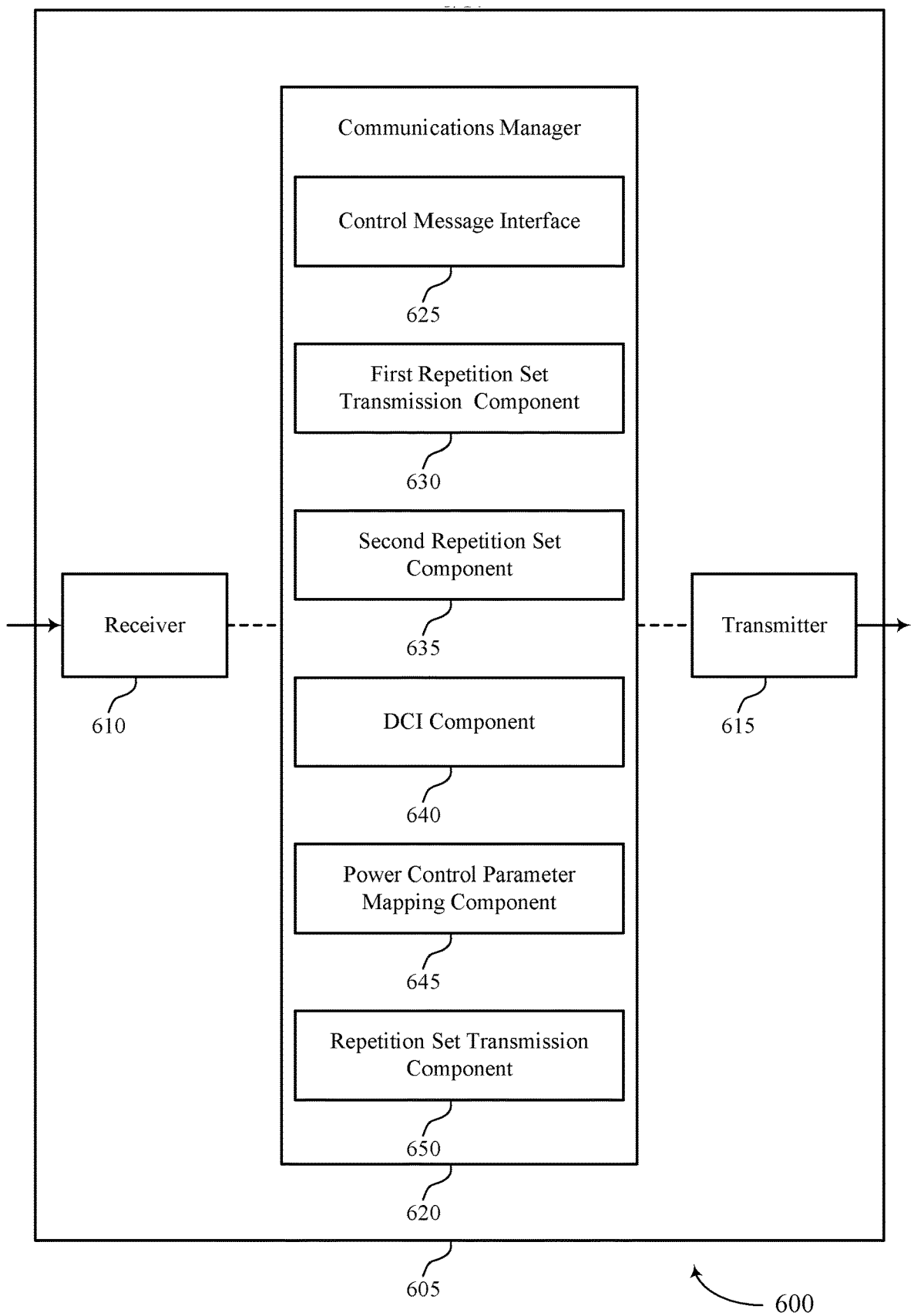

FIG. 6 shows a block diagram 600 of a device 605 that supports parameter configuration for CG based multi-transmission reception point communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to parameter configuration for CG based multi-transmission reception point communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to parameter configuration for CG based multi-transmission reception point communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of parameter configuration for CG based multi-transmission reception point communications as described herein. For example, the communications manager 620 may include a control message interface 625, a first repetition set transmission component 630, a second repetition set component 635, a DCI component 640, a power control parameter mapping component 645, a repetition set transmission component 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The control message interface 625 may be configured as or otherwise support a means for receiving one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions. The first repetition set transmission component 630 may be configured as or otherwise support a means for transmitting a first repetition of the first set of repetitions according to a first redundancy version value of the first redundancy version sequence. The second repetition set component 635 may be configured as or otherwise support a means for transmitting a second repetition of the second set of repetitions according to a second redundancy version value of the second redundancy version sequence.

The control message interface 625 may be configured as or otherwise support a means for receiving a first control message that indicates a first set of power control parameters and a second set of power control parameters. The DCI component 640 may be configured as or otherwise support a means for receiving a downlink control information message that schedules a first set of repetitions of an uplink transmission to a first transmission/reception point and a second set of repetitions of the uplink transmission to a second transmission/reception point. The power control parameter mapping component 645 may be configured as or otherwise support a means for mapping respective ones of the first set of power control parameters and the second set of power control parameters to the first set of repetitions and the second set of power control parameters in accordance with a power control parameter mapping rule. The repetition set transmission component 650 may be configured as or otherwise support a means for transmitting the first set of repetitions using a first transmission power and the second set of repetitions using a second transmission power, where the first transmission power and the second transmission power are determined based on the mapping of the first set of power control parameters and the second set of power control parameters.

Figure 7:
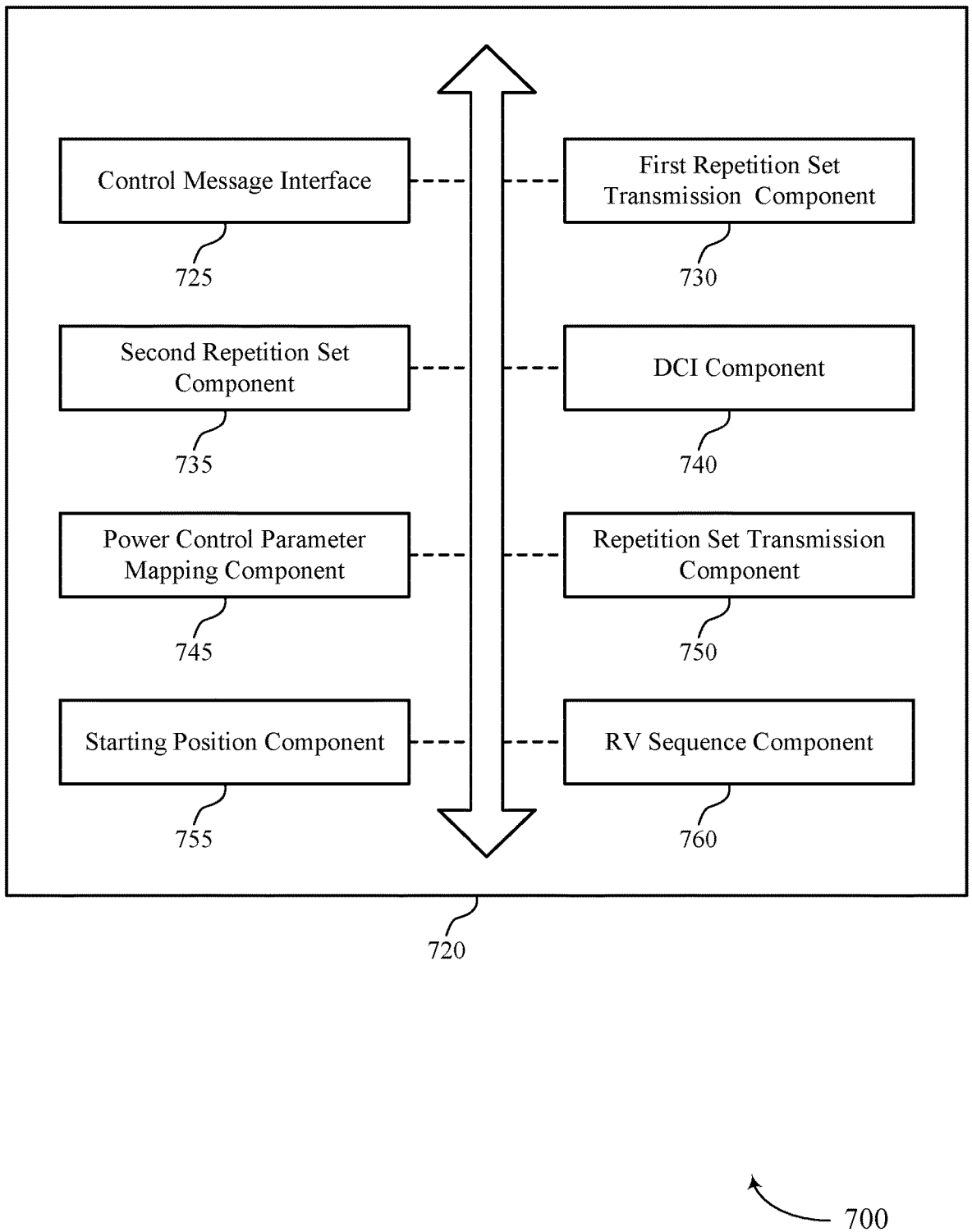
FIG. 7 shows a block diagram of a communications manager that supports parameter configuration for configured grant based multi-transmission reception point communications in accordance with aspects of the present disclosure.

FIG. 7 shows a block diagram 700 of a communications manager 720 that supports parameter configuration for CG based multi-transmission reception point communications in accordance with aspects of the present disclosure. The communications manager 720 may be an example of aspects of a communications manager 520, a communications manager 620, or both, as described herein. The communications manager 720, or various components thereof, may be an example of means for performing various aspects of parameter configuration for CG based multi-transmission reception point communications as described herein. For example, the communications manager 720 may include a control message interface 725, a first repetition set transmission component 730, a second repetition set component 735, a DCI component 740, a power control parameter mapping component 745, a repetition set transmission component 750, a starting position component 755, an RV sequence component 760, or any combination thereof. Each of these components may communicate, directly or indirectly, with one another (e.g., via one or more buses).

The communications manager 720 may support wireless communications at a UE in accordance with examples as disclosed herein. The control message interface 725 may be configured as or otherwise support a means for receiving one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions. The first repetition set transmission component 730 may be configured as or otherwise support a means for transmitting a first repetition of the first set of repetitions according to a first redundancy version value of the first redundancy version sequence. The second repetition set component 735 may be configured as or otherwise support a means for transmitting a second repetition of the second set of repetitions according to a second redundancy version value of the second redundancy version sequence.

In some examples, to support receiving the one or more control messages, the control message interface 725 may be configured as or otherwise support a means for receiving, via the one or more control messages, a pair of redundancy version sequences, where the pair specifies the first redundancy version sequence and the second redundancy version sequence.

In some examples, to support receiving the one or more control messages, the control message interface 725 may be configured as or otherwise support a means for receiving, via the one or more control messages, the first redundancy version sequence and an offset value, where the second redundancy version sequence is determined based on the first redundancy version sequence and the offset value.

In some examples, the RV sequence component 760 may be configured as or otherwise support a means for determining the second redundancy version sequence by shifting each redundancy version value of the first redundancy version sequence by the offset value, the shifting being an offset value shift within the first redundancy version sequence.

In some examples, the RV sequence component 760 may be configured as or otherwise support a means for determining the second redundancy version sequence by adding the offset value to each redundancy version value of the first redundancy version sequence and applying a modulo operator with a length of the first redundancy version sequence that results in each redundancy version value of the second redundancy version sequence.

In some examples, the starting position component 755 may be configured as or otherwise support a means for determining a starting redundancy version sequence position of an initial repetition of the uplink transmission from among zero-value redundancy version values of both the first redundancy version sequence and the second redundancy version sequence.

In some examples, the starting position component 755 may be configured as or otherwise support a means for determining a starting redundancy version sequence position of an initial repetition of the uplink transmission from among zero-value redundancy version values of only the first redundancy version sequence in accordance with the first set of repetitions corresponding to a first sounding reference signal resource set.

In some examples, the starting position component 755 may be configured as or otherwise support a means for determining that a starting redundancy version sequence position of an initial repetition of the uplink transmission is not a last repetition occasion of a combination of the first set of repetitions and the second set of repetitions.

In some examples, to support receiving the one or more control messages, the RV sequence component 760 may be configured as or otherwise support a means for receiving, via the one or more control messages, a first field that indicates the first redundancy version sequence and a second field that indicates the second redundancy version sequence, where the first redundancy version sequence is applied to the first set of repetitions and the second redundancy version sequence is applied to the second set of repetitions based on an order of the first field and the second field.

In some examples, to support receiving the one or more control messages, the DCI component 740 may be configured as or otherwise support a means for receiving a downlink control information messages that indicates an order of transmission of the first set of repetitions and the second set of repetitions, where the first redundancy version sequence is applied to the first set of repetitions and the second redundancy version sequence is applied to the second set of repetitions based on the order of transmission.

In some examples, the first repetition set transmission component 730 may be configured as or otherwise support a means for transmitting subsequent repetitions of the first set of repetitions using respective subsequent redundancy version values of the first redundancy version sequence. In some examples, the second repetition set component 735 may be configured as or otherwise support a means for transmitting subsequent repetitions of the second set of repetitions using respective subsequent redundancy version values of the second redundancy version sequence.

In some examples, the control message interface 725 may be configured as or otherwise support a means for receiving a first control message that indicates a first set of power control parameters and a second set of power control parameters. The DCI component 740 may be configured as or otherwise support a means for receiving a downlink control information message that schedules a first set of repetitions of an uplink transmission to a first transmission/reception point and a second set of repetitions of the uplink transmission to a second transmission/reception point. The power control parameter mapping component 745 may be configured as or otherwise support a means for mapping respective ones of the first set of power control parameters and the second set of power control parameters to the first set of repetitions and the second set of power control parameters in accordance with a power control parameter mapping rule. The repetition set transmission component 750 may be configured as or otherwise support a means for transmitting the first set of repetitions using a first transmission power and the second set of repetitions using a second transmission power, where the first transmission power and the second transmission power are determined based on the mapping of the first set of power control parameters and the second set of power control parameters.

In some examples, to support mapping the respective ones, the power control parameter mapping component 745 may be configured as or otherwise support a means for mapping one of the first set of power control parameters and the second set of power control parameters to the first set of repetitions in accordance with the mapping rule which specifies that a set of power control parameters having a lower identifier value is to be applied to a set of repetitions corresponding to a first sounding reference signal resource set.

In some examples, to support mapping the respective ones, the power control parameter mapping component 745 may be configured as or otherwise support a means for mapping one of the first set of power control parameters and the second set of power control parameters to the first set of repetitions in accordance with the mapping rule which specifies that a set of power control parameters having a higher identifier value is to be applied to a set of repetitions corresponding to a first sounding reference signal resource set.

In some examples, to support mapping the respective ones, the power control parameter mapping component 745 may be configured as or otherwise support a means for mapping one of the first set of power control parameters and the second set of power control parameters to the first set of repetitions in accordance with the mapping rule which specifies that a set of power control parameters indicated by a first field of the first control message is to be applied to a set of repetitions corresponding to a first sounding reference signal resource set.

In some examples, to support mapping the respective ones, the power control parameter mapping component 745 may be configured as or otherwise support a means for mapping one of the first set of power control parameters and the second set of power control parameters to the first set of repetitions in accordance with the mapping rule which specifies that a set of power control parameters indicated by a second field of the first control message is to be applied to a set of repetitions corresponding to a first sounding reference signal resource set.

In some examples, to support receiving the downlink control information message, the DCI component 740 may be configured as or otherwise support a means for receiving the downlink control information message that indicates an order of transmission of the first set of repetitions and the second set of repetitions, where one of the first set of power control parameters and the second set of power control parameters is mapped to the first set of repetitions in accordance with the mapping rule which specifies that a set of power control parameters is to be mapped to a set of repetitions based on a identifier value of a respective power control parameter and the order of transmission.

In some examples, to support mapping the respective ones, the power control parameter mapping component 745 may be configured as or otherwise support a means for mapping one of the first set of power control parameters and the second set of power control parameters to each CG uplink transmission occasions of a set of CG uplink transmission occasions activated by the downlink control information message in accordance with the mapping rule.

In some examples, the power control parameter mapping component 745 may be configured as or otherwise support a means for mapping one of the first set of power control parameters and the second set of power control parameters to the first set of repetitions of each CG uplink transmission occasion of the set of CG uplink transmission occasions in accordance with the mapping rule which specifies that a set of power control parameters indicated by a first field of the first control message is to be applied to a set of repetitions corresponding to a first sounding reference signal resource set.

In some examples, the power control parameter mapping component 745 may be configured as or otherwise support a means for mapping one of the first set of power control parameters and the second set of power control parameters to the first set of repetitions of a first CG uplink transmission occasion of the set of CG uplink transmission occasions in accordance with a dynamic switching field included in the downlink control information message, where remaining CG occasions of the set of CG uplink transmission occasions are mapped according to the mapping rule which specifies that a set of power control parameters indicated by a first field of the first control message is to be applied to a set of repetitions corresponding to a first sounding reference signal resource set.

In some examples, to support receiving the downlink control information message, the DCI component 740 may be configured as or otherwise support a means for receiving the downlink control information message that schedules a retransmission of a prior uplink CG transmission, where one of the first set of power control parameters and the second set of power control parameters are mapped to the first set of repetitions in accordance with a dynamic switching field included in the downlink control information message.

Figure 8:
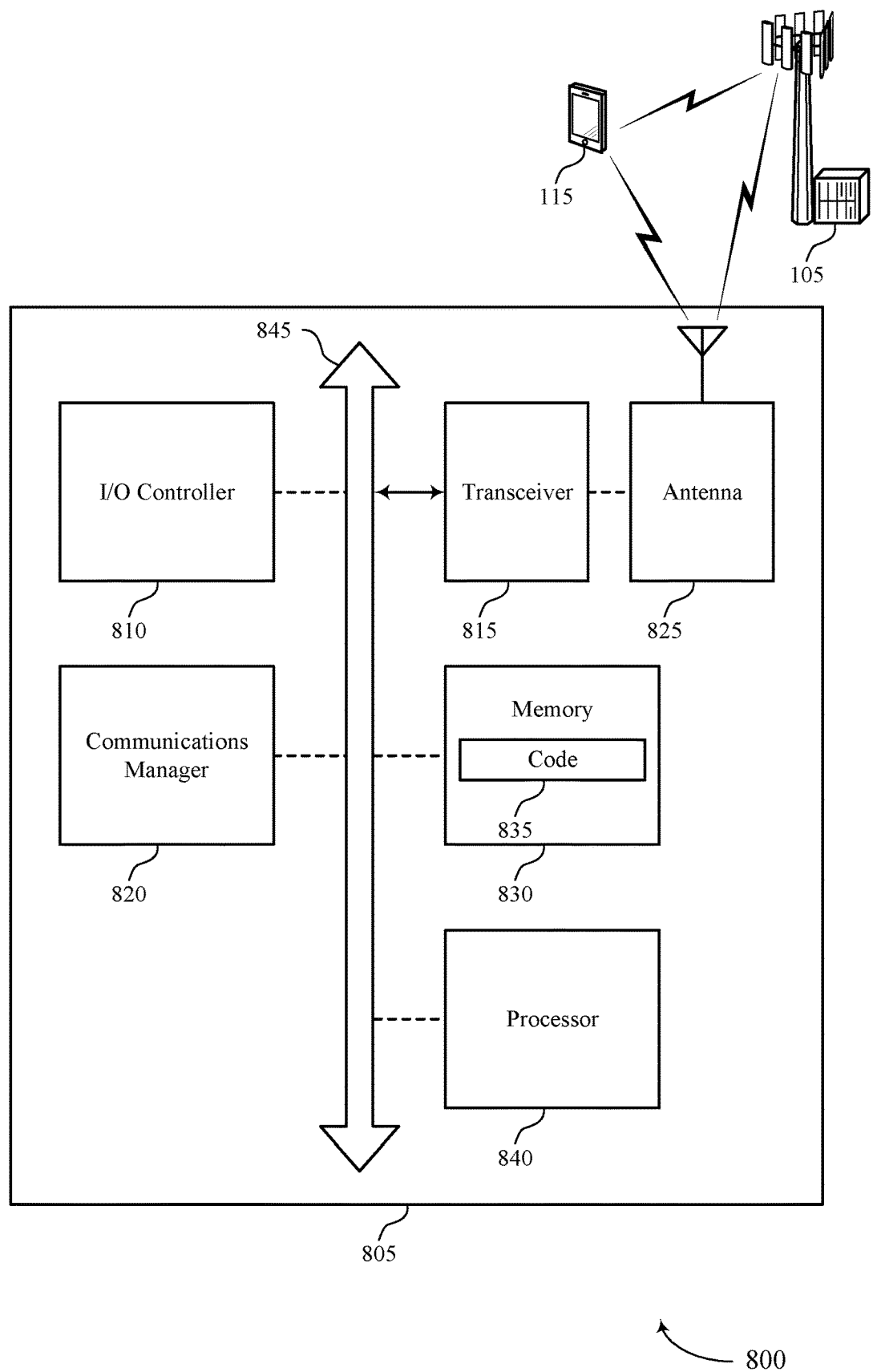
FIG. 8 shows a diagram of a system including a device that supports parameter configuration for configured grant based multi-transmission reception point communications in accordance with aspects of the present disclosure.

FIG. 8 shows a diagram of a system 800 including a device 805 that supports parameter configuration for CG based multi-transmission reception point communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting parameter configuration for CG based multi-transmission reception point communications). For example, the device 805 or a component of the device 805 may include a processor 840 and memory 830 coupled with the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions. The communications manager 820 may be configured as or otherwise support a means for transmitting a first repetition of the first set of repetitions according to a first redundancy version value of the first redundancy version sequence. The communications manager 820 may be configured as or otherwise support a means for transmitting a second repetition of the second set of repetitions according to a second redundancy version value of the second redundancy version sequence.

For example, the communications manager 820 may be configured as or otherwise support a means for receiving a first control message that indicates a first set of power control parameters and a second set of power control parameters. The communications manager 820 may be configured as or otherwise support a means for receiving a downlink control information message that schedules a first set of repetitions of an uplink transmission to a first transmission/reception point and a second set of repetitions of the uplink transmission to a second transmission/reception point. The communications manager 820 may be configured as or otherwise support a means for mapping respective ones of the first set of power control parameters and the second set of power control parameters to the first set of repetitions and the second set of power control parameters in accordance with a power control parameter mapping rule. The communications manager 820 may be configured as or otherwise support a means for transmitting the first set of repetitions using a first transmission power and the second set of repetitions using a second transmission power, where the first transmission power and the second transmission power are determined based on the mapping of the first set of power control parameters and the second set of power control parameters.

By including or configuring the communications manager 820 in accordance with examples as described herein, the device 805 may support techniques for more efficient utilization of communication resources by configuring RV sequences for decoding as well as reduced power consumption by configuring the power control parameters for uplink repetition sets. Additionally, the resources are more efficiently used, thereby improving communication, by supporting increasing likelihood of successful transmission based on the repetition sets supported by the techniques.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of parameter configuration for CG based multi-transmission reception point communications as described herein, or the processor 840 and the memory 830 may be otherwise configured to perform or support such operations.

Figure 9:
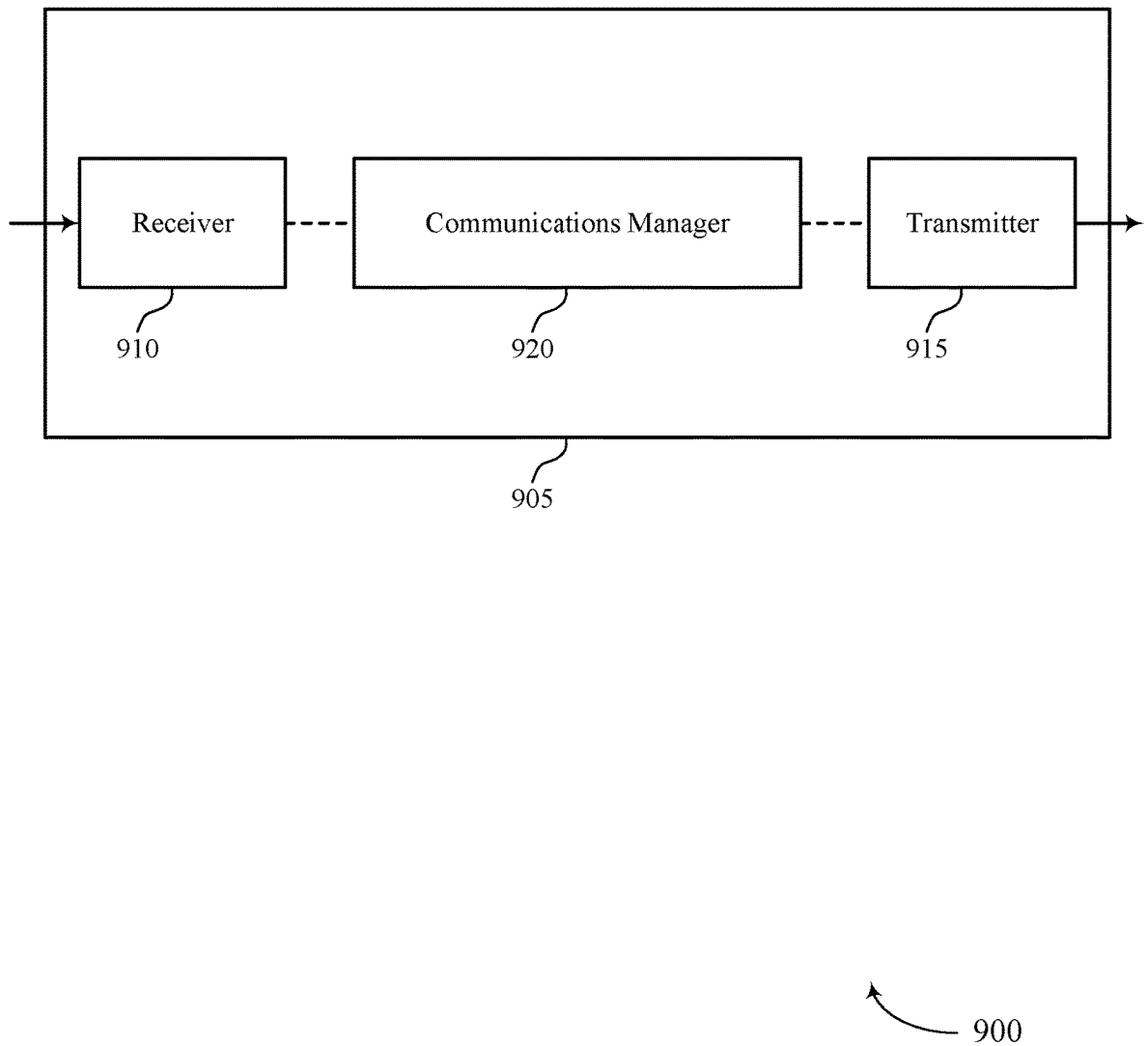
FIGS. 9 and 10 show block diagrams of devices that support parameter configuration for configured grant based multi-transmission reception point communications in accordance with aspects of the present disclosure.

FIG. 9 shows a block diagram 900 of a device 905 that supports parameter configuration for CG based multi-transmission reception point communications in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to parameter configuration for CG based multi-transmission reception point communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to parameter configuration for CG based multi-transmission reception point communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of parameter configuration for CG based multi-transmission reception point communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions. The communications manager 920 may be configured as or otherwise support a means for receiving a repetition of the uplink transmission of the first set of repetitions or the second set of repetitions based on a redundancy version value of the first redundancy version sequence or the second redundancy version sequence.

Additionally, or alternatively, the communications manager 920 may support wireless communications at a base station in accordance with examples as disclosed herein. For example, the communications manager 920 may be configured as or otherwise support a means for transmitting a first control message that indicates a first set of power control parameters and a second set of power control parameters. The communications manager 920 may be configured as or otherwise support a means for transmitting a downlink control information message that schedules a first set of repetitions of an uplink transmission to a first transmission/reception point and a second set of repetitions of the uplink transmission to a second transmission/reception point. The communications manager 920 may be configured as or otherwise support a means for mapping respective ones of the first set of power control parameters and the second set of power control parameters to the first set of repetitions and the second set of power control parameters in accordance with a power control parameter mapping rule. The communications manager 920 may be configured as or otherwise support a means for receiving a repetition of the uplink transmission using received power based on the mapping of the first set of power control parameters and the second set of power control parameters.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources by configuring RV sequences for decoding as well as reduced power consumption by configuring the power control parameters for uplink repetition sets. Additionally, the resources are more efficiently used by supporting increasing likelihood of successful transmission based on the repetition sets supported by the techniques.

Figure 10:
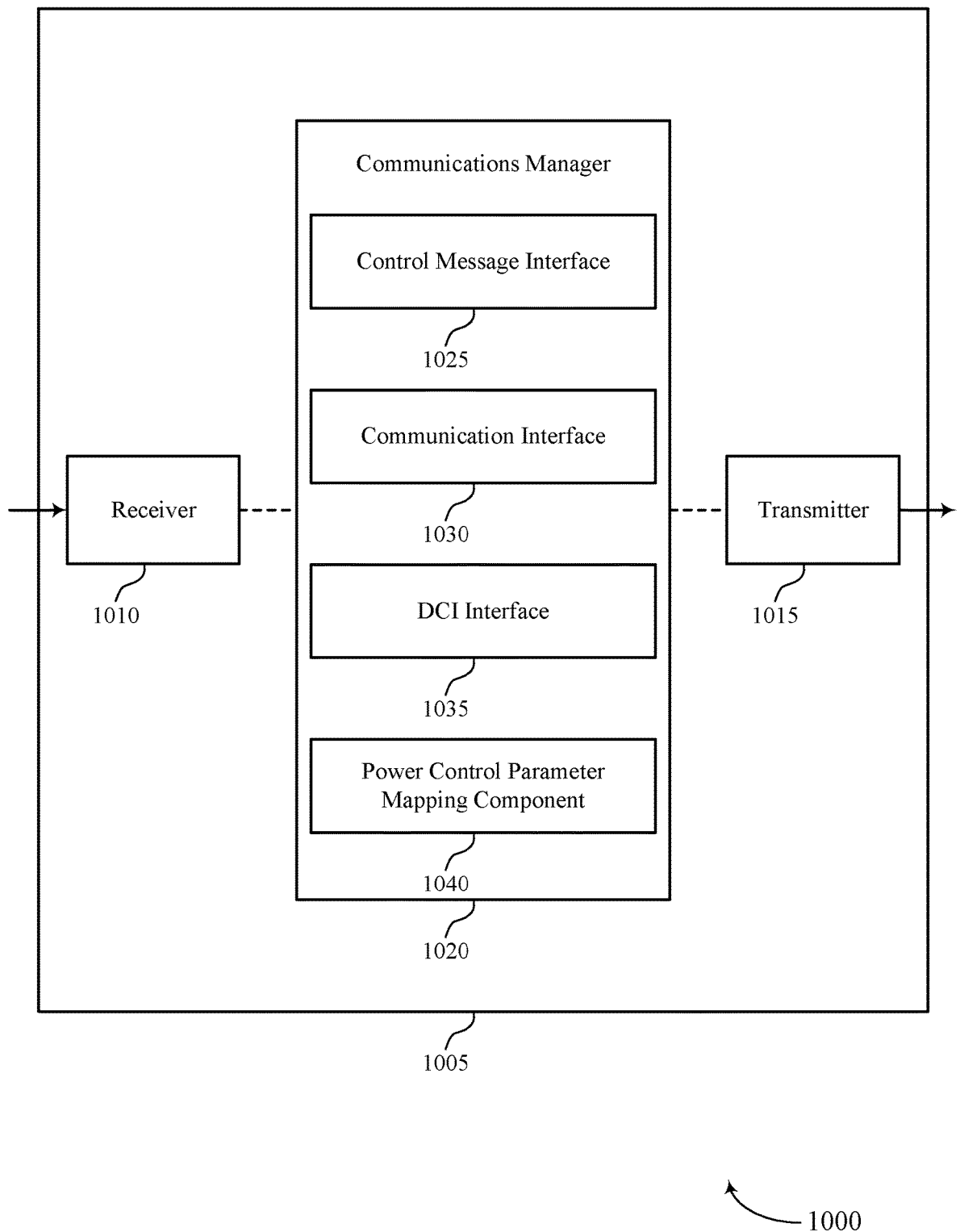

FIG. 10 shows a block diagram 1000 of a device 1005 that supports parameter configuration for CG based multi-transmission reception point communications in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to parameter configuration for CG based multi-transmission reception point communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to parameter configuration for CG based multi-transmission reception point communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of parameter configuration for CG based multi-transmission reception point communications as described herein. For example, the communications manager 1020 may include a control message interface 1025, a communication interface 1030, a DCI interface 1035, a power control parameter mapping component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The control message interface 1025 may be configured as or otherwise support a means for transmitting one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions. The communication interface 1030 may be configured as or otherwise support a means for receiving a repetition of the uplink transmission of the first set of repetitions or the second set of repetitions based on a redundancy version value of the first redundancy version sequence or the second redundancy version sequence.

Additionally, or alternatively, the communications manager 1020 may support wireless communications at a base station in accordance with examples as disclosed herein. The control message interface 1025 may be configured as or otherwise support a means for transmitting a first control message that indicates a first set of power control parameters and a second set of power control parameters. The DCI interface 1035 may be configured as or otherwise support a means for transmitting a downlink control information message that schedules a first set of repetitions of an uplink transmission to a first transmission/reception point and a second set of repetitions of the uplink transmission to a second transmission/reception point. The power control parameter mapping component 1040 may be configured as or otherwise support a means for mapping respective ones of the first set of power control parameters and the second set of power control parameters to the first set of repetitions and the second set of power control parameters in accordance with a power control parameter mapping rule. The communication interface 1030 may be configured as or otherwise support a means for receiving a repetition of the uplink transmission using received power based on the mapping of the first set of power control parameters and the second set of power control parameters.

Figure 11:
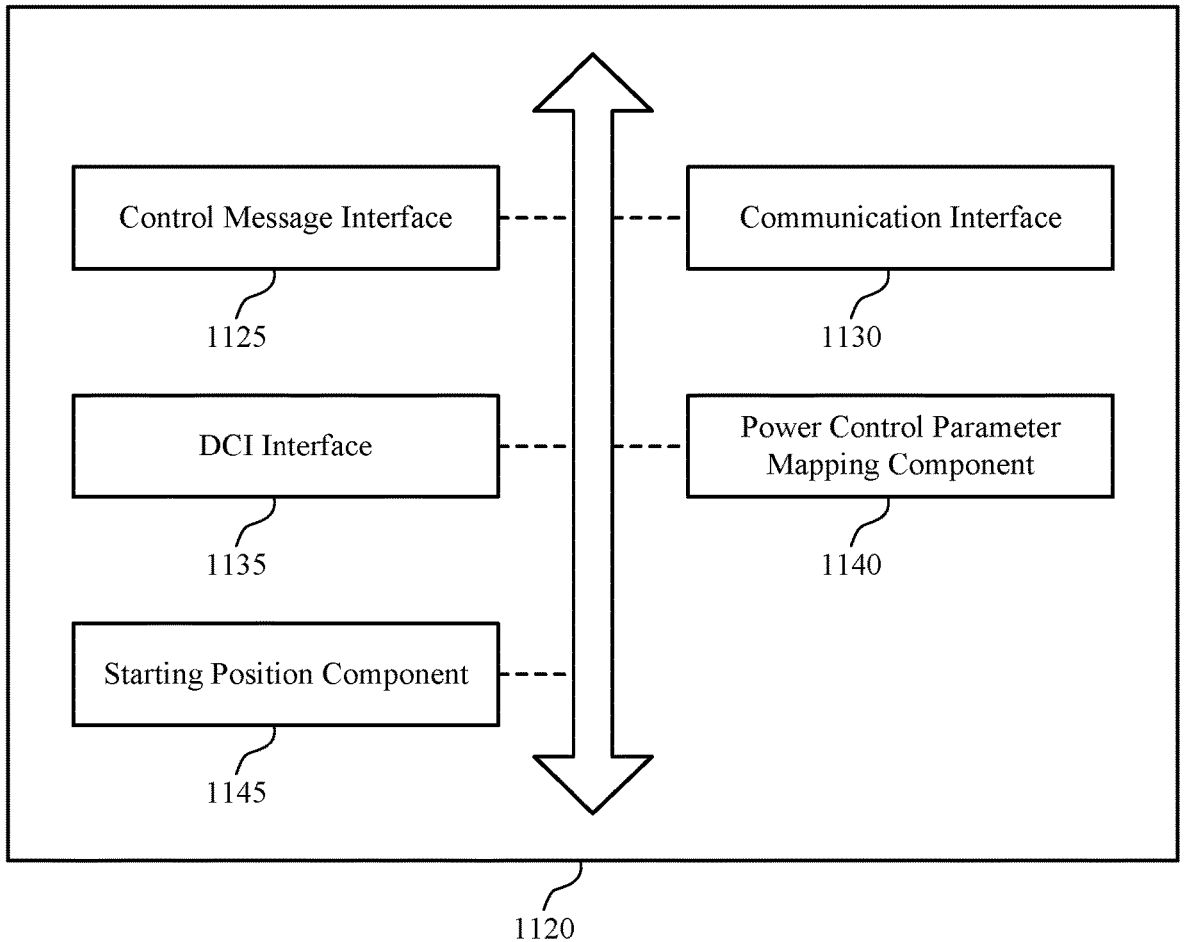
FIG. 11 shows a block diagram of a communications manager that supports parameter configuration for configured grant based multi-transmission reception point communications in accordance with aspects of the present disclosure.

FIG. 11 shows a block diagram 1100 of a communications manager 1120 that supports parameter configuration for CG based multi-transmission reception point communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of parameter configuration for CG based multi-transmission reception point communications as described herein. For example, the communications manager 1120 may include a control message interface 1125, a communication interface 1130, a DCI interface 1135, a power control parameter mapping component 1140, a starting position component 1145, or any combination thereof. Each of these components may communicate, directly or indirectly, with one another (e.g., via one or more buses).

The communications manager 1120 may support wireless communications at a base station in accordance with examples as disclosed herein. The control message interface 1125 may be configured as or otherwise support a means for transmitting one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions. The communication interface 1130 may be configured as or otherwise support a means for receiving a repetition of the uplink transmission of the first set of repetitions or the second set of repetitions based on a redundancy version value of the first redundancy version sequence or the second redundancy version sequence.

In some examples, to support transmitting the one or more control messages, the control message interface 1125 may be configured as or otherwise support a means for transmitting, via the one or more control messages, a pair of redundancy version sequences, where the pair specifies the first redundancy version sequence and the second redundancy version sequence.

In some examples, to support transmitting the one or more control messages, the control message interface 1125 may be configured as or otherwise support a means for transmitting via the one or more control messages, the first redundancy version sequence and an offset value, where the second redundancy version sequence is determined based on the first redundancy version sequence and the offset value.

In some examples, the second redundancy version sequence is determined by shifting each redundancy version value of the first redundancy version sequence by the offset value, the shifting being an offset value shift within the first redundancy version sequence.

In some examples, the second redundancy version sequence is determined by adding the offset value to each redundancy version value of the first redundancy version sequence and applying a modulo operator with a length of the first redundancy version sequence (e.g., four in some examples) that results in each redundancy version value of the second redundancy version sequence.

In some examples, the starting position component 1145 may be configured as or otherwise support a means for determining a starting redundancy version sequence position of an initial repetition of the uplink transmission from among zero-value redundancy version values of both the first redundancy version sequence and the second redundancy version sequence.

In some examples, the starting position component 1145 may be configured as or otherwise support a means for determining a starting redundancy version sequence position of an initial repetition of the uplink transmission from among zero-value redundancy version values of only the first redundancy version sequence in accordance with the first set of repetitions corresponding to a first sounding reference signal resource set.

In some examples, to support receiving the one or more control messages, the starting position component 1145 may be configured as or otherwise support a means for determining that a starting redundancy version sequence position of an initial repetition of the uplink transmission is not a last repetition occasion of a combination of the first set of repetitions and the second set of repetitions.

In some examples, to support transmitting the one or more control messages, the control message interface 1125 may be configured as or otherwise support a means for transmitting via the one or more control messages, a first field that indicates the first redundancy version sequence and a second field that indicates the second redundancy version sequence, where the first redundancy version sequence is applied to the first set of repetitions and the second redundancy version sequence is applied to the second set of repetitions based on an order of the first field and the second field.

In some examples, to support transmitting the one or more control messages, the DCI interface 1135 may be configured as or otherwise support a means for transmitting a downlink control information messages that indicates an order of transmission of the first set of repetitions and the second set of repetitions, where the first redundancy version sequence is to be applied to the first set of repetitions and the second redundancy version sequence is to be applied to the second set of repetitions based on the order of transmission.

Additionally, or alternatively, the communications manager 1120 may support wireless communications at a base station in accordance with examples as disclosed herein. In some examples, the control message interface 1125 may be configured as or otherwise support a means for transmitting a first control message that indicates a first set of power control parameters and a second set of power control parameters. The DCI interface 1135 may be configured as or otherwise support a means for transmitting a downlink control information message that schedules a first set of repetitions of an uplink transmission to a first transmission/reception point and a second set of repetitions of the uplink transmission to a second transmission/reception point. The power control parameter mapping component 1140 may be configured as or otherwise support a means for mapping respective ones of the first set of power control parameters and the second set of power control parameters to the first set of repetitions and the second set of power control parameters in accordance with a power control parameter mapping rule. In some examples, the communication interface 1130 may be configured as or otherwise support a means for receiving a repetition of the uplink transmission using received power based on the mapping of the first set of power control parameters and the second set of power control parameters.

In some examples, to support mapping the respective ones, the power control parameter mapping component 1140 may be configured as or otherwise support a means for mapping one of the first set of power control parameters and the second set of power control parameters to the first set of repetitions in accordance with the mapping rule which specifies that a set of power control parameters having a lower identifier value is to be applied to a set of repetitions corresponding to a first sounding reference signal resource set.

In some examples, to support mapping the respective ones, the power control parameter mapping component 1140 may be configured as or otherwise support a means for mapping one of the first set of power control parameters and the second set of power control parameters to the first set of repetitions in accordance with the mapping rule which specifies that a set of power control parameters having a higher identifier value is to be applied to a set of repetitions corresponding to a first sounding reference signal resource set.

In some examples, to support mapping the respective ones, the power control parameter mapping component 1140 may be configured as or otherwise support a means for mapping one of the first set of power control parameters and the second set of power control parameters to the first set of repetitions in accordance with the mapping rule which specifies that a set of power control parameters indicated by a first field of the first control message is to be applied to a set of repetitions corresponding to a first sounding reference signal resource set.

In some examples, to support mapping the respective ones, the power control parameter mapping component 1140 may be configured as or otherwise support a means for mapping one of the first set of power control parameters and the second set of power control parameters to the first set of repetitions in accordance with the mapping rule which specifies that a set of power control parameters indicated by a second field of the first control message is to be applied to a set of repetitions corresponding to a first sounding reference signal resource set.

In some examples, to support transmitting the downlink control information message, the DCI interface 1135 may be configured as or otherwise support a means for transmitting the downlink control information message that indicates an order of transmission of the first set of repetitions and the second set of repetitions, one of the first set of power control parameters and the second set of power control parameters being mapped to the first set of repetitions in accordance with the mapping rule which specifies that a set of power control parameters is to be mapped to a set of repetitions based on a identifier value of a respective power control parameter of the first set of power control parameters and the second set of power control parameters and the order of transmission.

In some examples, to support mapping the respective ones, the power control parameter mapping component 1140 may be configured as or otherwise support a means for mapping one of the first set of power control parameters and the second set of power control parameters to each CG uplink transmission occasions of a set of CG uplink transmission occasions activated by the downlink control information message in accordance with the mapping rule.

In some examples, the power control parameter mapping component 1140 may be configured as or otherwise support a means for mapping one of the first set of power control parameters and the second set of power control parameters to the first set of repetitions of each CG uplink transmission occasion of the set of CG uplink transmission occasions in accordance with the mapping rule which specifies that a set of power control parameters indicated by a first field of the first control message is to be applied to a set of repetitions corresponding to a first sounding reference signal resource set.

In some examples, the power control parameter mapping component 1140 may be configured as or otherwise support a means for mapping one of the first set of power control parameters and the second set of power control parameters to the first set of repetitions of a first CG uplink transmission occasion of the set of CG uplink transmission occasions in accordance with a dynamic switching field included in the downlink control information message, where remaining CG occasions of the set of CG uplink transmission occasions are mapped according to the mapping rule which specifies that a set of power control parameters indicated by a first field of the first control message is to be applied to a set of repetitions corresponding to a first sounding reference signal resource set.

In some examples, to support transmitting the downlink control information message, the DCI interface 1135 may be configured as or otherwise support a means for transmitting the downlink control information message that schedules a retransmission of a prior uplink CG transmission, where one of the first set of power control parameters and the second set of power control parameters are mapped to the first set of repetitions in accordance with a dynamic switching field included in the downlink control information message.

Figure 12:
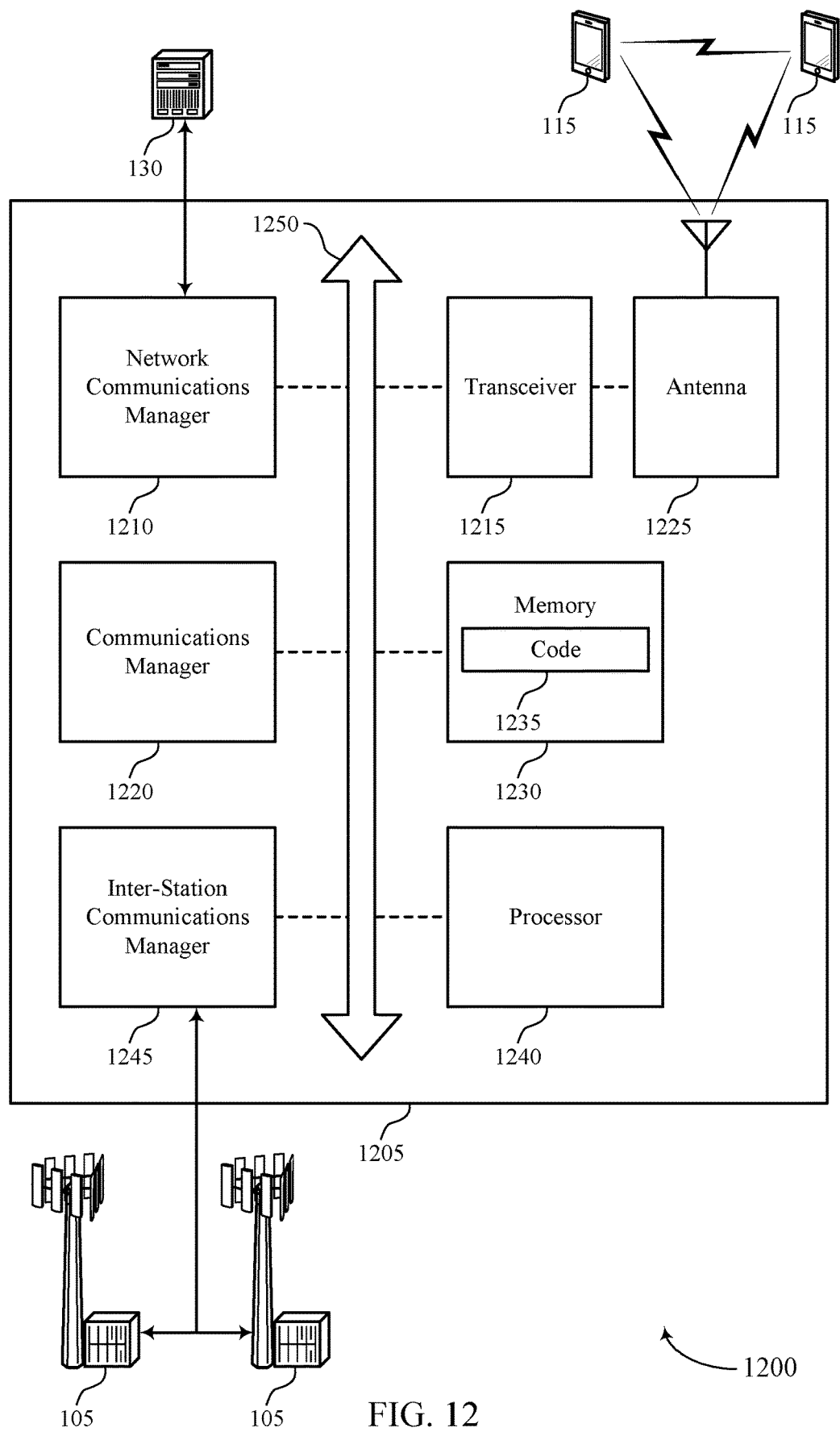
FIG. 12 shows a diagram of a system including a device that supports parameter configuration for configured grant based multi-transmission reception point communications in accordance with aspects of the present disclosure.

FIG. 12 shows a diagram of a system 1200 including a device 1205 that supports parameter configuration for CG based multi-transmission reception point communications in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting parameter configuration for CG based multi-transmission reception point communications). For example, the device 1205 or a component of the device 1205 may include a processor 1240 and memory 1230 coupled with the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions. The communications manager 1220 may be configured as or otherwise support a means for receiving a repetition of the uplink transmission of the first set of repetitions or the second set of repetitions based on a redundancy version value of the first redundancy version sequence or the second redundancy version sequence.

Additionally, or alternatively, the communications manager 1220 may support wireless communications at a base station in accordance with examples as disclosed herein. For example, the communications manager 1220 may be configured as or otherwise support a means for transmitting a first control message that indicates a first set of power control parameters and a second set of power control parameters. The communications manager 1220 may be configured as or otherwise support a means for transmitting a downlink control information message that schedules a first set of repetitions of an uplink transmission to a first transmission/reception point and a second set of repetitions of the uplink transmission to a second transmission/reception point. The communications manager 1220 may be configured as or otherwise support a means for mapping respective ones of the first set of power control parameters and the second set of power control parameters to the first set of repetitions and the second set of power control parameters in accordance with a power control parameter mapping rule. The communications manager 1220 may be configured as or otherwise support a means for receiving a repetition of the uplink transmission using received power based on the mapping of the first set of power control parameters and the second set of power control parameters.

By including or configuring the communications manager 1220 in accordance with examples as described herein, the device 1205 may support techniques for more efficient utilization of communication resources by configuring RV sequences for decoding as well as reduced power consumption by configuring the power control parameters for uplink repetition sets. Additionally, the resources are more efficiently used, thereby improving communication, by supporting increasing likelihood of successful transmission based on the repetition sets supported by the techniques.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of parameter configuration for CG based multi-transmission reception point communications as described herein, or the processor 1240 and the memory 1230 may be otherwise configured to perform or support such operations.

Figure 13:
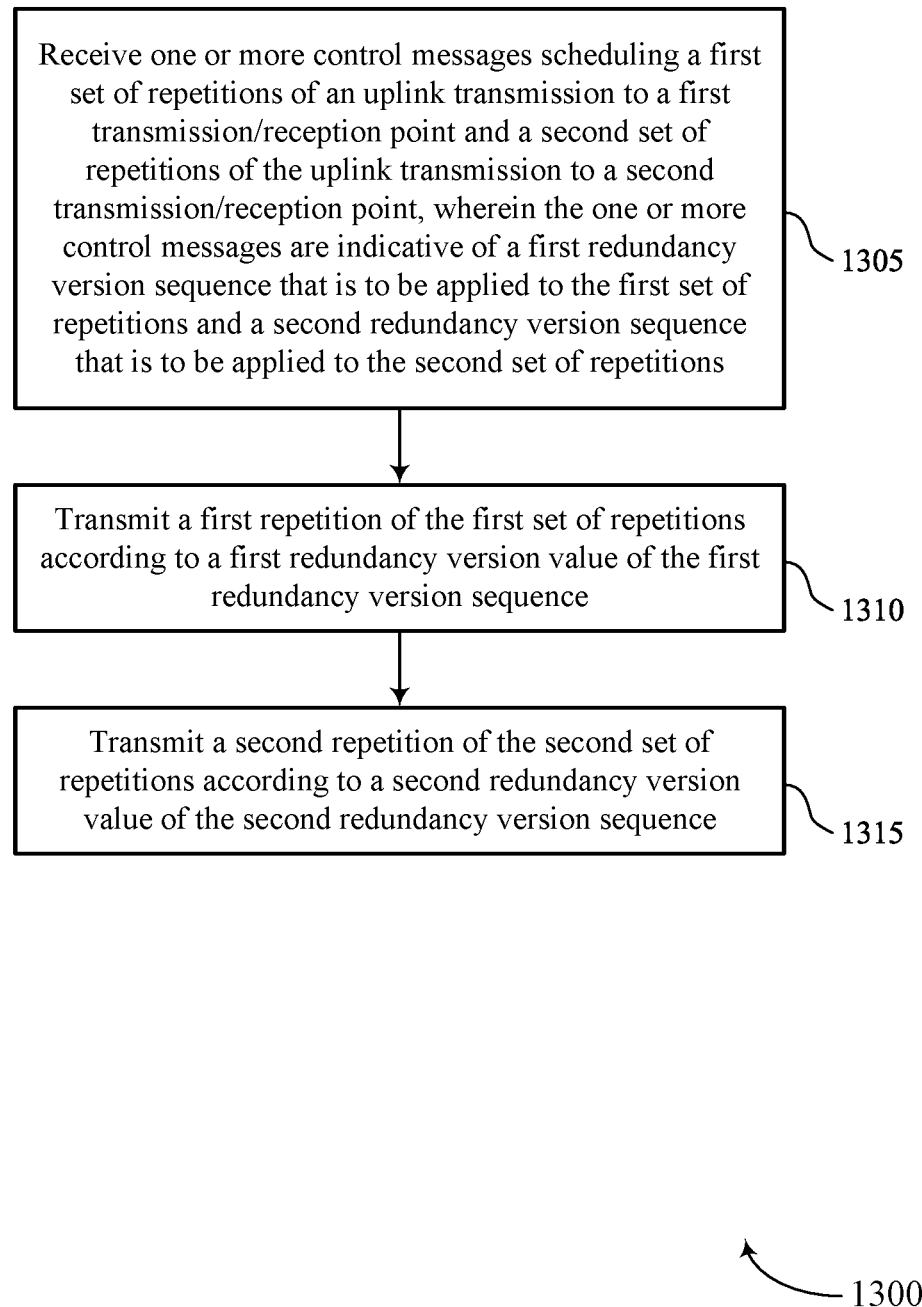
FIGS. 13 through 17 show flowcharts illustrating methods that support parameter configuration for configured grant based multi-transmission reception point communications in accordance with aspects of the present disclosure.

FIG. 13 shows a flowchart illustrating a method 1300 that supports parameter configuration for CG based multi-transmission reception point communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions. The operations of 1305 may be performed in accordance with examples as disclosed herein. In some examples, aspects of the operations of 1305 may be performed by a control message interface 725 as described with reference to FIG. 7.

At 1310, the method may include transmitting a first repetition of the first set of repetitions according to a first redundancy version value of the first redundancy version sequence. The operations of 1310 may be performed in accordance with examples as disclosed herein. In some examples, aspects of the operations of 1310 may be performed by a first repetition set transmission component 730 as described with reference to FIG. 7.

At 1315, the method may include transmitting a second repetition of the second set of repetitions according to a second redundancy version value of the second redundancy version sequence. The operations of 1315 may be performed in accordance with examples as disclosed herein. In some examples, aspects of the operations of 1315 may be performed by a second repetition set transmission component 735 as described with reference to FIG. 7.

Figure 14:
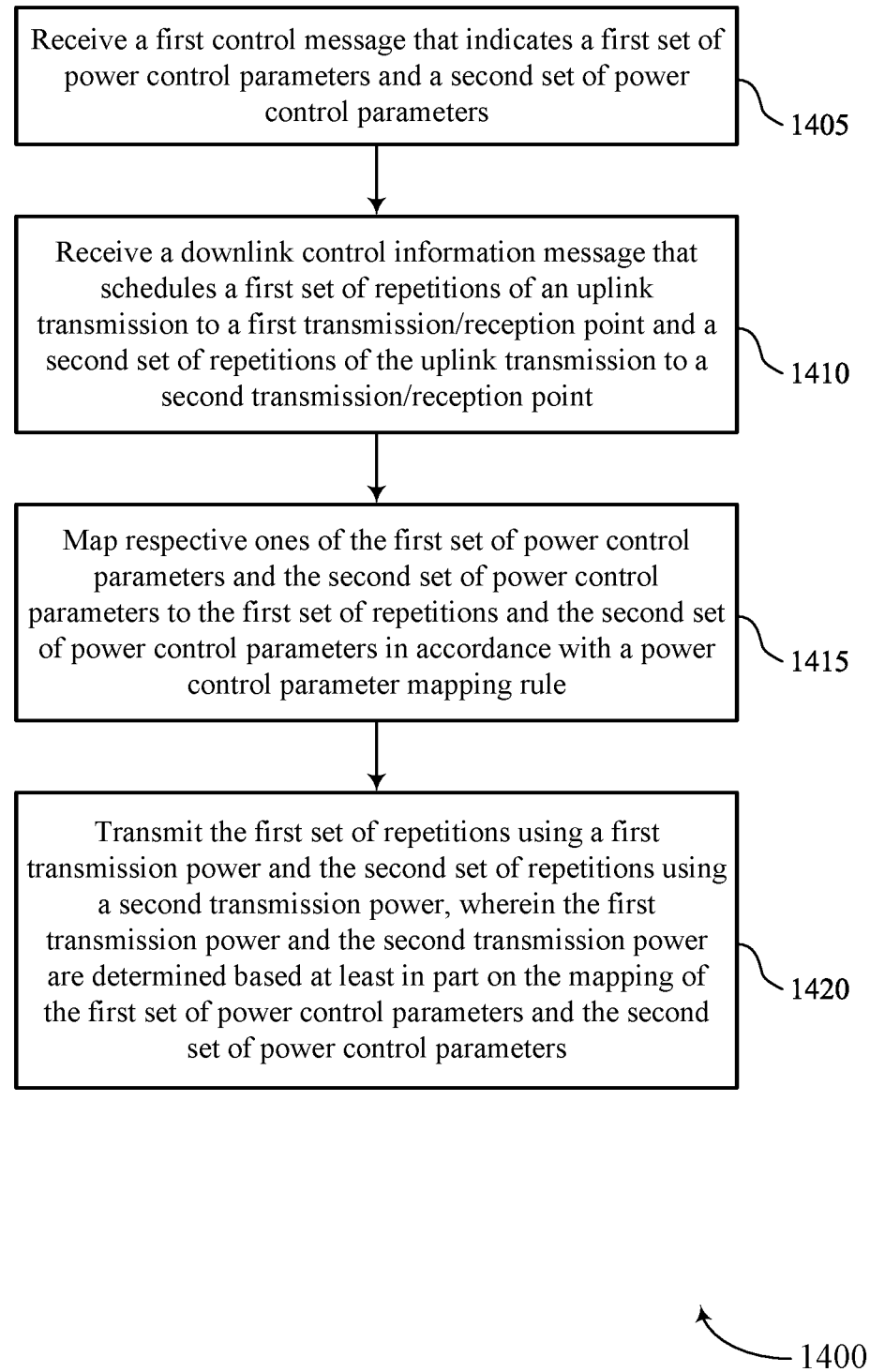

FIG. 14 shows a flowchart illustrating a method 1400 that supports parameter configuration for CG based multi-transmission reception point communications in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a first control message that indicates a first set of power control parameters and a second set of power control parameters. The operations of 1405 may be performed in accordance with examples as disclosed herein. In some examples, aspects of the operations of 1405 may be performed by a control message interface 725 as described with reference to FIG. 7.

At 1410, the method may include receiving a downlink control information message that schedules a first set of repetitions of an uplink transmission to a first transmission/reception point and a second set of repetitions of the uplink transmission to a second transmission/reception point. The operations of 1410 may be performed in accordance with examples as disclosed herein. In some examples, aspects of the operations of 1410 may be performed by a DCI component 740 as described with reference to FIG. 7.

At 1415, the method may include mapping respective ones of the first set of power control parameters and the second set of power control parameters to the first set of repetitions and the second set of power control parameters in accordance with a power control parameter mapping rule. The operations of 1415 may be performed in accordance with examples as disclosed herein. In some examples, aspects of the operations of 1415 may be performed by a power control parameter mapping component 745 as described with reference to FIG. 7.

At 1420, the method may include transmitting the first set of repetitions using a first transmission power and the second set of repetitions using a second transmission power, where the first transmission power and the second transmission power are determined based on the mapping of the first set of power control parameters and the second set of power control parameters. The operations of 1420 may be performed in accordance with examples as disclosed herein. In some examples, aspects of the operations of 1420 may be performed by a repetition set transmission component 750 as described with reference to FIG. 7.

Figure 15:
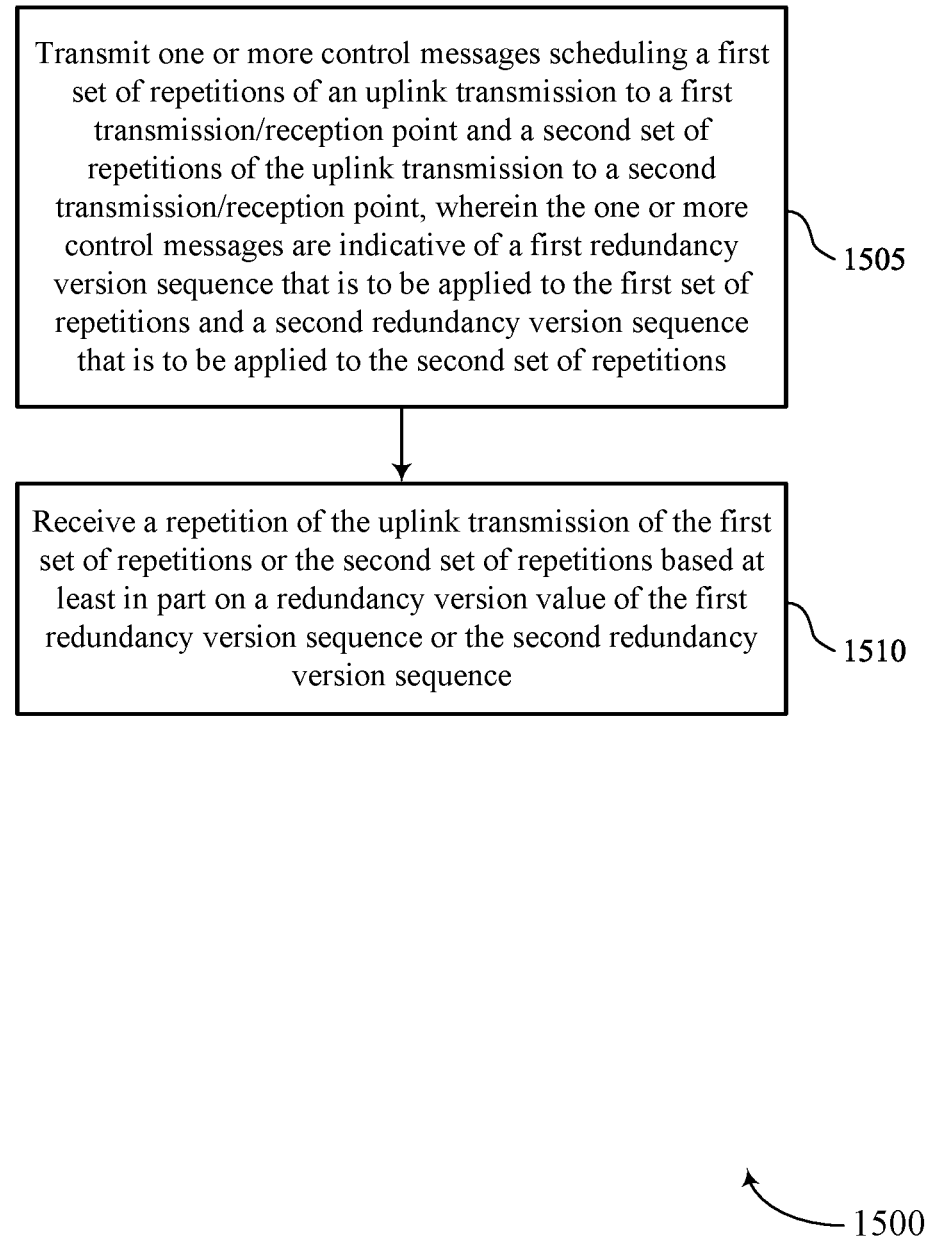

FIG. 15 shows a flowchart illustrating a method 1500 that supports parameter configuration for CG based multi-transmission reception point communications in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1505, the method may include transmitting one or more control messages scheduling a first set of repetitions of an uplink transmission to a first transmission/reception point and a second set of repetitions of the uplink transmission to a second transmission/reception point, where the one or more control messages are indicative of a first redundancy version sequence that is to be applied to the first set of repetitions and a second redundancy version sequence that is to be applied to the second set of repetitions. The operations of 1505 may be performed in accordance with examples as disclosed herein. In some examples, aspects of the operations of 1505 may be performed by a control message interface 1125 as described with reference to FIG. 11.

At 1510, the method may include receiving a repetition of the uplink transmission of the first set of repetitions or the second set of repetitions based on a redundancy version value of the first redundancy version sequence or the second redundancy version sequence. The operations of 1510 may be performed in accordance with examples as disclosed herein. In some examples, aspects of the operations of 1510 may be performed by a communication interface 1130 as described with reference to FIG. 11.

Figure 16:
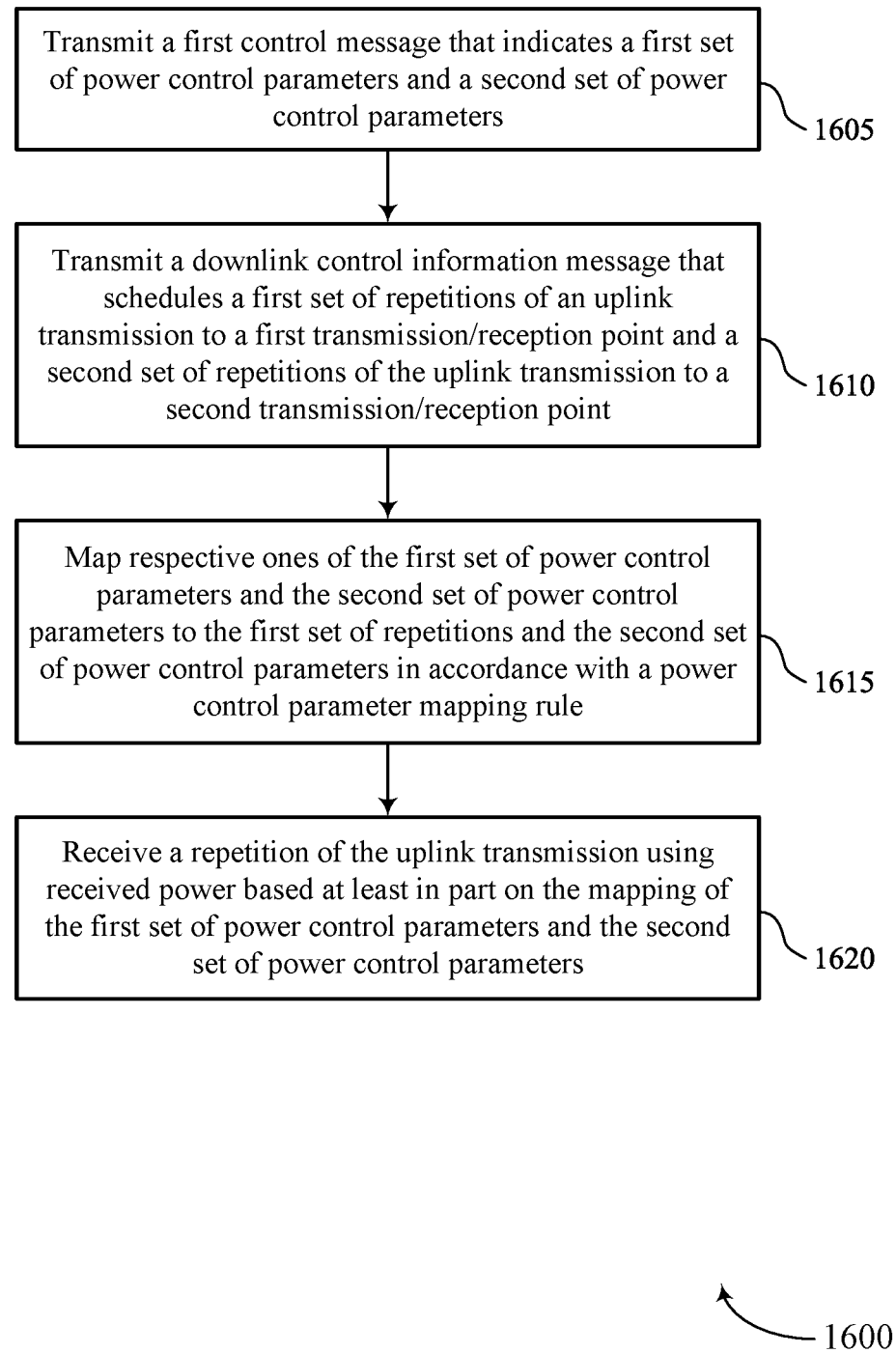

FIG. 16 shows a flowchart illustrating a method 1600 that supports parameter configuration for CG based multi-transmission reception point communications in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1605, the method may include transmitting a first control message that indicates a first set of power control parameters and a second set of power control parameters. The operations of 1605 may be performed in accordance with examples as disclosed herein. In some examples, aspects of the operations of 1605 may be performed by a control message interface 1125 as described with reference to FIG. 11.

At 1610, the method may include transmitting a downlink control information message that schedules a first set of repetitions of an uplink transmission to a first transmission/reception point and a second set of repetitions of the uplink transmission to a second transmission/reception point. The operations of 1610 may be performed in accordance with examples as disclosed herein. In some examples, aspects of the operations of 1610 may be performed by a DCI interface 1135 as described with reference to FIG. 11.

At 1615, the method may include mapping respective ones of the first set of power control parameters and the second set of power control parameters to the first set of repetitions and the second set of power control parameters in accordance with a power control parameter mapping rule. The operations of 1615 may be performed in accordance with examples as disclosed herein. In some examples, aspects of the operations of 1615 may be performed by a power control parameter mapping component 1140 as described with reference to FIG. 11.

At 1620, the method may include receiving a repetition of the uplink transmission using received power based on the mapping of the first set of power control parameters and the second set of power control parameters. The operations of 1620 may be performed in accordance with examples as disclosed herein. In some examples, aspects of the operations of 1620 may be performed by a communication interface 1130 as described with reference to FIG. 11.

Figure 17:
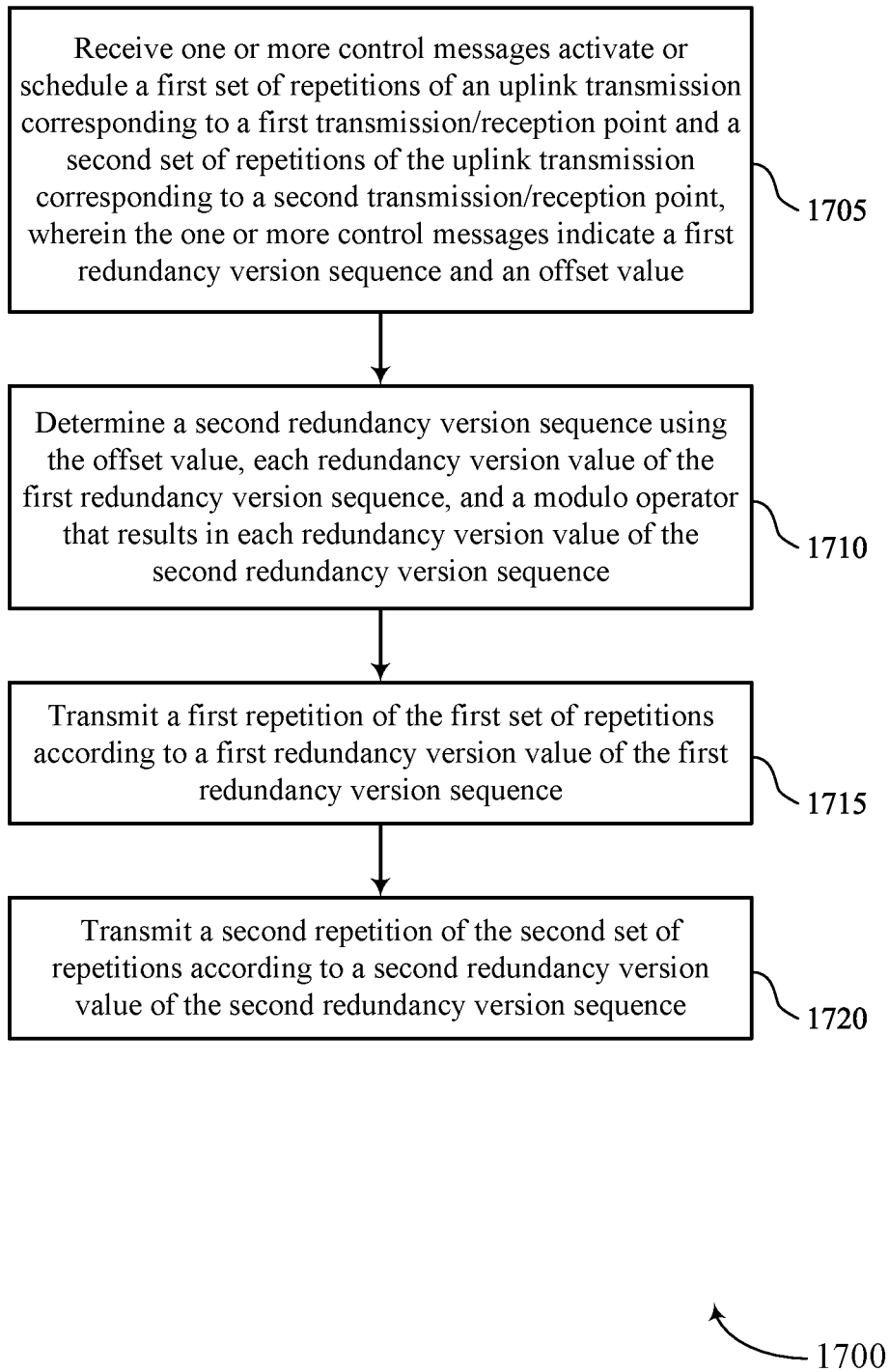

FIG. 17 shows a flowchart illustrating a method 1700 that supports parameter configuration for configured grant based multi-transmission reception point communications in accordance with one or more aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1705, the method may include receiving one or more control messages that activate or schedule a first set of repetitions of an uplink transmission corresponding to a first transmission/reception point and a second set of repetitions of the uplink transmission corresponding to a second transmission/reception point, where the one or more control messages indicate a first redundancy version sequence and an offset value. The operations of 1705 may be performed in accordance with examples as disclosed herein. In some examples, aspects of the operations of 1705 may be performed by a control message interface 725 as described with reference to FIG. 7.

At 1710, the method may include determining a second redundancy version sequence using the offset value, each redundancy version value of the first redundancy version sequence, and a modulo operator that results in each redundancy version value of the second redundancy version sequence. The operations of 1710 may be performed in accordance with examples as disclosed herein. In some examples, aspects of the operations of 1710 may be performed by an RV sequence component 760 as described with reference to FIG. 7.

At 1715, the method may include transmitting a first repetition of the first set of repetitions according to a first redundancy version value of the first redundancy version sequence. The operations of 1715 may be performed in accordance with examples as disclosed herein. In some examples, aspects of the operations of 1715 may be performed by a first repetition set transmission component 730 as described with reference to FIG. 7.

At 1720, the method may include transmitting a second repetition of the second set of repetitions according to a second redundancy version value of the second redundancy version sequence. The operations of 1720 may be performed in accordance with examples as disclosed herein. In some examples, aspects of the operations of 1720 may be performed by a second repetition set component 735 as described with reference to FIG. 7.

The following provides an overview of aspects of the present disclosure:

Aspect 1: A method for wireless communications at a UE, comprising: receiving one or more control messages scheduling a first set of repetitions of an uplink transmission to a first transmission/reception point and a second set of repetitions of the uplink transmission to a second transmission/reception point, wherein the one or more control messages are indicative of a first redundancy version sequence that is to be applied to the first set of repetitions and a second redundancy version sequence that is to be applied to the second set of repetitions; transmitting a first repetition of the first set of repetitions according to a first redundancy version value of the first redundancy version sequence; and transmitting a second repetition of the second set of repetitions according to a second redundancy version value of the second redundancy version sequence.

Aspect 2: The method of aspect 1, wherein receiving the one or more control messages comprises: receiving, via the one or more control messages, a pair of redundancy version sequences, wherein the pair specifies the first redundancy version sequence and the second redundancy version sequence.

Aspect 3: The method of aspect 1, wherein receiving the one or more control messages comprises: receiving, via the one or more control messages, the first redundancy version sequence and an offset value, wherein the second redundancy version sequence is determined based at least in part on the first redundancy version sequence and the offset value.

Aspect 4: The method of aspect 3, further comprising: determining the second redundancy version sequence by shifting each redundancy version value of the first redundancy version sequence by the offset value, the shifting being an offset value shift within the first redundancy version sequence.

Aspect 5: The method of aspect 3, further comprising: determining the second redundancy version sequence by adding the offset value to each redundancy version value of the first redundancy version sequence and applying a modulo operator with a length of the first redundancy version sequence that results in each redundancy version value of the second redundancy version sequence.

Aspect 6: The method of any of aspects 1 through 5, further comprising: determining a starting redundancy version sequence position of an initial repetition of the uplink transmission from among zero-value redundancy version values of both the first redundancy version sequence and the second redundancy version sequence.

Aspect 7: The method of any of aspects 1 through 5, further comprising: determining a starting redundancy version sequence position of an initial repetition of the uplink transmission from among zero-value redundancy version values of only the first redundancy version sequence in accordance with the first set of repetitions corresponding to a first sounding reference signal resource set.

Aspect 8: The method of any of aspects 1 through 7, further comprising: determining that a starting redundancy version sequence position of an initial repetition of the uplink transmission is not a last repetition occasion of a combination of the first set of repetitions and the second set of repetitions.

Aspect 9: The method of any of aspects 1 through 2 and 6 through 8, wherein receiving the one or more control messages comprises: receiving, via the one or more control messages, a first field that indicates the first redundancy version sequence and a second field that indicates the second redundancy version sequence, wherein the first redundancy version sequence is applied to the first set of repetitions and the second redundancy version sequence is applied to the second set of repetitions based at least in part on an order of the first field and the second field.

Aspect 10: The method of any of aspects 1 through 9, wherein receiving the one or more control messages comprises: receiving a downlink control information messages that indicates an order of transmission of the first set of repetitions and the second set of repetitions, wherein the first redundancy version sequence is applied to the first set of repetitions and the second redundancy version sequence is applied to the second set of repetitions based at least in part on the order of transmission.

Aspect 11: The method of any of aspects 1 through 10, further comprising: transmitting subsequent repetitions of the first set of repetitions using respective subsequent redundancy version values of the first redundancy version sequence; and transmitting subsequent repetitions of the second set of repetitions using respective subsequent redundancy version values of the second redundancy version sequence.

Aspect 12: A method for wireless communications at a UE comprising: receiving a first control message that indicates a first set of power control parameters and a second set of power control parameters; receiving a downlink control information message that schedules a first set of repetitions of an uplink transmission to a first transmission/reception point and a second set of repetitions of the uplink transmission to a second transmission/reception point; mapping respective ones of the first set of power control parameters and the second set of power control parameters to the first set of repetitions and the second set of power control parameters in accordance with a power control parameter mapping rule; and transmitting the first set of repetitions using a first transmission power and the second set of repetitions using a second transmission power, wherein the first transmission power and the second transmission power are determined based at least in part on the mapping of the first set of power control parameters and the second set of power control parameters.

Aspect 13: The method of aspect 12, wherein mapping the respective ones comprises: mapping one of the first set of power control parameters and the second set of power control parameters to the first set of repetitions in accordance with the mapping rule which specifies that a set of power control parameters having a lower identifier value is to be applied to a set of repetitions corresponding to a first sounding reference signal resource set.

Aspect 14: The method of aspect 12, wherein mapping the respective ones comprises: mapping one of the first set of power control parameters and the second set of power control parameters to the first set of repetitions in accordance with the mapping rule which specifies that a set of power control parameters having a higher identifier value is to be applied to a set of repetitions corresponding to a first sounding reference signal resource set.

Aspect 15: The method of any of aspects 12 through 14, wherein mapping the respective ones comprises: mapping one of the first set of power control parameters and the second set of power control parameters to the first set of repetitions in accordance with the mapping rule which specifies that a set of power control parameters indicated by a first field of the first control message is to be applied to a set of repetitions corresponding to a first sounding reference signal resource set.

Aspect 16: The method of any of aspects 12 through 14, wherein mapping the respective ones comprises: mapping one of the first set of power control parameters and the second set of power control parameters to the first set of repetitions in accordance with the mapping rule which specifies that a set of power control parameters indicated by a second field of the first control message is to be applied to a set of repetitions corresponding to a first sounding reference signal resource set.

Aspect 17: The method of any of aspects 12 through 16, wherein receiving the downlink control information message comprises: receiving the downlink control information message that indicates an order of transmission of the first set of repetitions and the second set of repetitions, wherein one of the first set of power control parameters and the second set of power control parameters is mapped to the first set of repetitions in accordance with the mapping rule which specifies that a set of power control parameters is to be mapped to a set of repetitions based at least in part on a identifier value of a respective power control parameter and the order of transmission.

Aspect 18: The method of any of aspects 12 through 17, wherein mapping the respective ones comprises: mapping one of the first set of power control parameters and the second set of power control parameters to each configured grant uplink transmission occasions of a set of configured grant uplink transmission occasions activated by the downlink control information message in accordance with the mapping rule.

Aspect 19: The method of aspect 18, further comprising: mapping one of the first set of power control parameters and the second set of power control parameters to the first set of repetitions of each configured grant uplink transmission occasion of the set of configured grant uplink transmission occasions in accordance with the mapping rule which specifies that a set of power control parameters indicated by a first field of the first control message is to be applied to a set of repetitions corresponding to a first sounding reference signal resource set.

Aspect 20: The method of any of aspects 18 through 19, further comprising: mapping one of the first set of power control parameters and the second set of power control parameters to the first set of repetitions of a first configured grant uplink transmission occasion of the set of configured grant uplink transmission occasions in accordance with a dynamic switching field included in the downlink control information message, wherein remaining configured grant occasions of the set of configured grant uplink transmission occasions are mapped according to the mapping rule which specifies that a set of power control parameters indicated by a first field of the first control message is to be applied to a set of repetitions corresponding to a first sounding reference signal resource set.

Aspect 21: The method of any of aspects 12 through 20, wherein receiving the downlink control information message comprises: receiving the downlink control information message that schedules a retransmission of a prior uplink configured grant transmission, wherein one of the first set of power control parameters and the second set of power control parameters are mapped to the first set of repetitions in accordance with a dynamic switching field included in the downlink control information message.

Aspect 22: A method for wireless communications at a base station, comprising: transmitting one or more control messages scheduling a first set of repetitions of an uplink transmission to a first transmission/reception point and a second set of repetitions of the uplink transmission to a second transmission/reception point, wherein the one or more control messages are indicative of a first redundancy version sequence that is to be applied to the first set of repetitions and a second redundancy version sequence that is to be applied to the second set of repetitions; and receiving a repetition of the uplink transmission of the first set of repetitions or the second set of repetitions based at least in part on a redundancy version value of the first redundancy version sequence or the second redundancy version sequence.

Aspect 23: The method of aspect 22, wherein transmitting the one or more control messages comprises: transmitting, via the one or more control messages, a pair of redundancy version sequences, wherein the pair specifies the first redundancy version sequence and the second redundancy version sequence.

Aspect 24: The method of aspect 22, wherein transmitting the one or more control messages comprises: transmitting via the one or more control messages, the first redundancy version sequence and an offset value, wherein the second redundancy version sequence is determined based at least in part on the first redundancy version sequence and the offset value.

Aspect 25: The method of aspect 24, wherein the second redundancy version sequence is determined by shifting each redundancy version value of the first redundancy version sequence by the offset value, the shifting being an offset value shift within the first redundancy version sequence.

Aspect 26: The method of aspect 24, wherein the second redundancy version sequence is determined by adding the offset value to each redundancy version value of the first redundancy version sequence and applying a modulo operator with a length of the first redundancy version sequence that results in each redundancy version value of the second redundancy version sequence.

Aspect 27: The method of any of aspects 22 through 26, further comprising: determining a starting redundancy version sequence position of an initial repetition of the uplink transmission from among zero-value redundancy version values of both the first redundancy version sequence and the second redundancy version sequence.

Aspect 28: The method of any of aspects 22 through 26, further comprising: determining a starting redundancy version sequence position of an initial repetition of the uplink transmission from among zero-value redundancy version values of only the first redundancy version sequence in accordance with the first set of repetitions corresponding to a first sounding reference signal resource set.

Aspect 29: The method of any of aspects 22 through 28, wherein receiving the one or more control messages comprises: determining that a starting redundancy version sequence position of an initial repetition of the uplink transmission is not a last repetition occasion of a combination of the first set of repetitions and the second set of repetitions.

Aspect 30: The method of any of aspects 22 through 23 and 27 through 29, wherein transmitting the one or more control messages comprises: transmitting via the one or more control messages, a first field that indicates the first redundancy version sequence and a second field that indicates the second redundancy version sequence, wherein the first redundancy version sequence is applied to the first set of repetitions and the second redundancy version sequence is applied to the second set of repetitions based at least in part on an order of the first field and the second field.

Aspect 31: The method of any of aspects 22 through 30, wherein transmitting the one or more control messages comprises: transmitting a downlink control information messages that indicates an order of transmission of the first set of repetitions and the second set of repetitions, wherein the first redundancy version sequence is to be applied to the first set of repetitions and the second redundancy version sequence is to be applied to the second set of repetitions based at least in part on the order of transmission.

Aspect 32: A method for wireless communications at a base station, comprising: transmitting a first control message that indicates a first set of power control parameters and a second set of power control parameters; transmitting a downlink control information message that schedules a first set of repetitions of an uplink transmission to a first transmission/reception point and a second set of repetitions of the uplink transmission to a second transmission/reception point; mapping respective ones of the first set of power control parameters and the second set of power control parameters to the first set of repetitions and the second set of power control parameters in accordance with a power control parameter mapping rule; and receiving a repetition of the uplink transmission using received power based at least in part on the mapping of the first set of power control parameters and the second set of power control parameters.

Aspect 33: The method of aspect 32, wherein mapping the respective ones comprises: mapping one of the first set of power control parameters and the second set of power control parameters to the first set of repetitions in accordance with the mapping rule which specifies that a set of power control parameters having a lower identifier value is to be applied to a set of repetitions corresponding to a first sounding reference signal resource set.

Aspect 34: The method of aspect 32, wherein mapping the respective ones comprises: mapping one of the first set of power control parameters and the second set of power control parameters to the first set of repetitions in accordance with the mapping rule which specifies that a set of power control parameters having a higher identifier value is to be applied to a set of repetitions corresponding to a first sounding reference signal resource set.

Aspect 35: The method of any of aspects 32 through 34, wherein mapping the respective ones comprises: mapping one of the first set of power control parameters and the second set of power control parameters to the first set of repetitions in accordance with the mapping rule which specifies that a set of power control parameters indicated by a first field of the first control message is to be applied to a set of repetitions corresponding to a first sounding reference signal resource set.

Aspect 36: The method of any of aspects 32 through 34, wherein mapping the respective ones comprises: mapping one of the first set of power control parameters and the second set of power control parameters to the first set of repetitions in accordance with the mapping rule which specifies that a set of power control parameters indicated by a second field of the first control message is to be applied to a set of repetitions corresponding to a first sounding reference signal resource set.

Aspect 37: The method of any of aspects 32 through 36, wherein transmitting the downlink control information message comprises: transmitting the downlink control information message that indicates an order of transmission of the first set of repetitions and the second set of repetitions, one of the first set of power control parameters and the second set of power control parameters being mapped to the first set of repetitions in accordance with the mapping rule which specifies that a set of power control parameters is to be mapped to a set of repetitions based at least in part on a identifier value of a respective power control parameter of the first set of power control parameters and the second set of power control parameters and the order of transmission.

Aspect 38: The method of any of aspects 32 through 37, wherein mapping the respective ones comprises: mapping one of the first set of power control parameters and the second set of power control parameters to each configured grant uplink transmission occasions of a set of configured grant uplink transmission occasions activated by the downlink control information message in accordance with the mapping rule.

Aspect 39: The method of aspect 38, further comprising: mapping one of the first set of power control parameters and the second set of power control parameters to the first set of repetitions of each configured grant uplink transmission occasion of the set of configured grant uplink transmission occasions in accordance with the mapping rule which specifies that a set of power control parameters indicated by a first field of the first control message is to be applied to a set of repetitions corresponding to a first sounding reference signal resource set.

Aspect 40: The method of any of aspects 38 through 39, further comprising: mapping one of the first set of power control parameters and the second set of power control parameters to the first set of repetitions of a first configured grant uplink transmission occasion of the set of configured grant uplink transmission occasions in accordance with a dynamic switching field included in the downlink control information message, wherein remaining configured grant occasions of the set of configured grant uplink transmission occasions are mapped according to the mapping rule which specifies that a set of power control parameters indicated by a first field of the first control message is to be applied to a set of repetitions corresponding to a first sounding reference signal resource set.

Aspect 41: The method of any of aspects 32 through 40, wherein transmitting the downlink control information message comprises: transmitting the downlink control information message that schedules a retransmission of a prior uplink configured grant transmission, wherein one of the first set of power control parameters and the second set of power control parameters are mapped to the first set of repetitions in accordance with a dynamic switching field included in the downlink control information message.

Aspect 42: An apparatus for wireless communications at a UE, comprising a processor; memory coupled with the processor; and instructions stored in the memory and executable by the processor to cause the apparatus to perform a method of any of aspects 1 through 11.

Aspect 43: An apparatus for wireless communications at a UE, comprising at least one means for performing a method of any of aspects 1 through 11.

Aspect 44: A non-transitory computer-readable medium storing code for wireless communications at a UE, the code comprising instructions executable by a processor to perform a method of any of aspects 1 through 11.

Aspect 45: An apparatus comprising a processor; memory coupled with the processor; and instructions stored in the memory and executable by the processor to cause the apparatus to perform a method of any of aspects 12 through 21.

Aspect 46: An apparatus comprising at least one means for performing a method of any of aspects 12 through 21.

Aspect 47: A non-transitory computer-readable medium storing code the code comprising instructions executable by a processor to perform a method of any of aspects 12 through 21.

Aspect 48: An apparatus for wireless communications at a base station, comprising a processor; memory coupled with the processor; and instructions stored in the memory and executable by the processor to cause the apparatus to perform a method of any of aspects 22 through 31.

Aspect 49: An apparatus for wireless communications at a base station, comprising at least one means for performing a method of any of aspects 22 through 31.

Aspect 50: A non-transitory computer-readable medium storing code for wireless communications at a base station, the code comprising instructions executable by a processor to perform a method of any of aspects 22 through 31.

Aspect 51: An apparatus for wireless communications at a base station, comprising a processor; memory coupled with the processor; and instructions stored in the memory and executable by the processor to cause the apparatus to perform a method of any of aspects 32 through 41.

Aspect 52: An apparatus for wireless communications at a base station, comprising at least one means for performing a method of any of aspects 32 through 41.

Aspect 53: A non-transitory computer-readable medium storing code for wireless communications at a base station, the code comprising instructions executable by a processor to perform a method of any of aspects 32 through 41.

Aspect 54: A method for wireless communications at a UE, comprising: receiving one or more control messages that activate or schedule a first set of repetitions of an uplink transmission corresponding to a first transmission/reception point and a second set of repetitions of the uplink transmission corresponding to a second transmission/reception point, wherein the one or more control messages indicate a first redundancy version sequence and an offset value; determining a second redundancy version sequence using the offset value, each redundancy version value of the first redundancy version sequence, and a modulo operator that results in each redundancy version value of the second redundancy version sequence; transmitting a first repetition of the first set of repetitions according to a first redundancy version value of the first redundancy version sequence; and transmitting a second repetition of the second set of repetitions according to a second redundancy version value of the second redundancy version sequence.

Aspect 55: The method of aspect 54, further comprising: determining a starting redundancy version sequence position of an initial repetition of the uplink transmission from among zero-value redundancy version values of both the first redundancy version sequence and the second redundancy version sequence.

Aspect 56: The method of aspect 54, wherein determining the second redundancy version sequence comprises: determining the second redundancy version sequence by adding the offset value to each redundancy version value of the first redundancy version sequence and applying the modulo operator with a length of the first redundancy version sequence or a value of four that results in each redundancy version value of the second redundancy version sequence.

Aspect 57: The method of any of aspects 54 through 56, further comprising: determining that a starting redundancy version sequence position of an initial repetition of the uplink transmission is not a last repetition occasion of a combination of the first set of repetitions and the second set of repetitions.

Aspect 58: The method of aspect 57, wherein a number of configured repetitions is greater than or equal to eight and the starting redundancy version sequence position of the initial repetition of the uplink transmission is not the last repetition occasion based at least in part on the number of configured repetitions being greater than or equal to eight.

Aspect 59: The method of any of aspects 54 through 58, wherein receiving the one or more control messages comprises: receiving a downlink control information message that indicates an order of transmission of the first set of repetitions and the second set of repetitions, wherein the first redundancy version sequence is applied to the first set of repetitions and the second redundancy version sequence is applied to the second set of repetitions based at least in part on the order of transmission.

Aspect 60: The method of any of aspects 54 through 59, further comprising: transmitting subsequent repetitions of the first set of repetitions using respective subsequent redundancy version values of the first redundancy version sequence; and transmitting subsequent repetitions of the second set of repetitions using respective subsequent redundancy version values of the second redundancy version sequence.

Aspect 61: The method of any of aspects 54 through 60, wherein one or more repetitions of the first set of repetitions and one or more repetitions of the second set of repetitions are transmitted according to a cyclic beam mapping pattern or a sequential beam mapping pattern.

Aspect 62: The method of any of aspects 54 through 61, wherein the first set of repetitions are associated with a first sounding reference signal resource set and the second set of repetitions are associated with a second sounding reference signal resource set.

Aspect 63: An apparatus for wireless communications at a UE, comprising a processor; memory coupled with the processor; and instructions stored in the memory and executable by the processor to cause the apparatus to perform a method of any of aspects 54 through 62.

Aspect 64: An apparatus for wireless communications at a UE, comprising at least one means for performing a method of any of aspects 54 through 62.

Aspect 65: A non-transitory computer-readable medium storing code for wireless communications at a UE, the code comprising instructions executable by a processor to perform a method of any of aspects 54 through 62.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving one or more control messages that activate or schedule a first set of repetitions of an uplink transmission corresponding to a first transmission/reception point and a second set of repetitions of the uplink transmission corresponding to a second transmission/reception point, wherein the one or more control messages indicate a first redundancy version sequence and an offset value;

determining a second redundancy version sequence using the offset value, each redundancy version value of the first redundancy version sequence, and a modulo operator that results in each redundancy version value of the second redundancy version sequence;

determining a starting redundancy version sequence position of an initial repetition of the uplink transmission from among zero-value redundancy version values of both the first redundancy version sequence and the second redundancy version sequence;

transmitting a first repetition of the first set of repetitions according to a first redundancy version value of the first redundancy version sequence; and transmitting a second repetition of the second set of repetitions according to a second redundancy version value of the second redundancy version sequence, wherein one of the first repetition or the second repetition is the initial repetition.

2. The method of claim 1, wherein determining the second redundancy version sequence comprises:

determining the second redundancy version sequence by adding the offset value to each redundancy version value of the first redundancy version sequence and applying the modulo operator with a length of the first redundancy version sequence that results in each redundancy version value of the second redundancy version sequence.

3. The method of claim 1, further comprising:

determining that the starting redundancy version sequence position of the initial repetition of the uplink transmission is not a last repetition occasion of a combination of the first set of repetitions and the second set of repetitions.

4. The method of claim 3, wherein a number of configured repetitions is greater than or equal to eight and the starting redundancy version sequence position of the initial repetition of the uplink transmission is not the last repetition occasion based at least in part on the number of configured repetitions being greater than or equal to eight.

5. The method of claim 1, wherein receiving the one or more control messages comprises:

receiving a downlink control information message that indicates an order of transmission of the first set of repetitions and the second set of repetitions, wherein the first redundancy version sequence is applied to the first set of repetitions and the second redundancy version sequence is applied to the second set of repetitions based at least in part on the order of transmission.

6. The method of claim 1, further comprising:

transmitting subsequent repetitions of the first set of repetitions using respective subsequent redundancy version values of the first redundancy version sequence; and transmitting subsequent repetitions of the second set of repetitions using respective subsequent redundancy version values of the second redundancy version sequence.

7. The method of claim 1, wherein one or more repetitions of the first set of repetitions and one or more repetitions of the second set of repetitions are transmitted according to a cyclic beam mapping pattern or a sequential beam mapping pattern.

8. The method of claim 1, wherein the first set of repetitions are associated with a first sounding reference signal resource set and the second set of repetitions are associated with a second sounding reference signal resource set.

9. A user equipment (UE) for wireless communication, comprising:

a processor;

memory coupled with the processor; and instructions stored in the memory and executable by the processor to cause the UE to:

receive one or more control messages that activate or schedule a first set of repetitions of an uplink transmission corresponding to a first transmission/reception point and a second set of repetitions of the uplink transmission corresponding to a second transmission/reception point, wherein the one or more control messages indicate a first redundancy version sequence and an offset value;

determine a second redundancy version sequence using the offset value, each redundancy version value of the first redundancy version sequence, and a modulo operator that results in each redundancy version value of the second redundancy version sequence;

determine a starting redundancy version sequence position of an initial repetition of the uplink transmission from among zero-value redundancy version values of both the first redundancy version sequence and the second redundancy version sequence;

transmit a first repetition of the first set of repetitions according to a first redundancy version value of the first redundancy version sequence; and transmit a second repetition of the second set of repetitions according to a second redundancy version value of the second redundancy version sequence, wherein one of the first repetition or the second repetition is the initial repetition.

10. The UE of claim 9, wherein the instructions to determine the second redundancy version sequence are executable by the processor to cause the UE to:

determine the second redundancy version sequence by adding the offset value to each redundancy version value of the first redundancy version sequence and applying the modulo operator with a length of the first redundancy version sequence that results in each redundancy version value of the second redundancy version sequence.

11. The UE of claim 9, wherein the instructions are further executable by the processor to cause the UE to:

determine that the starting redundancy version sequence position of the initial repetition of the uplink transmission is not a last repetition occasion of a combination of the first set of repetitions and the second set of repetitions.

12. The UE of claim 11, wherein a number of configured repetitions is greater than or equal to eight and the starting redundancy version sequence position of the initial repetition of the uplink transmission is not the last repetition occasion based at least in part on the number of configured repetitions being greater than or equal to eight.

13. The UE of claim 9, wherein the instructions to receive the one or more control messages are executable by the processor to cause the UE to:

receive a downlink control information message that indicates an order of transmission of the first set of repetitions and the second set of repetitions, wherein the first redundancy version sequence is applied to the first set of repetitions and the second redundancy version sequence is applied to the second set of repetitions based at least in part on the order of transmission.

14. The UE of claim 9, wherein the instructions are further executable by the processor to cause the UE to:
transmit subsequent repetitions of the first set of repetitions using respective subsequent redundancy version values of the first redundancy version sequence; and
transmit subsequent repetitions of the second set of repetitions using respective subsequent redundancy version values of the second redundancy version sequence.

15. The UE of claim 9, wherein one or more repetitions of the first set of repetitions and one or more repetitions of the second set of repetitions are transmitted according to a cyclic beam mapping pattern or a sequential beam mapping pattern.

16. The UE of claim 9, wherein the first set of repetitions are associated with a first sounding reference signal resource set and the second set of repetitions are associated with a second sounding reference signal resource set.

17. A user equipment (UE) for wireless communication, comprising:
means for receiving one or more control messages that activate or schedule a first set of repetitions of an uplink transmission corresponding to a first transmission/reception point and a second set of repetitions of the uplink transmission corresponding to a second transmission/reception point, wherein the one or more control messages indicate a first redundancy version sequence and an offset value;
means for determining a second redundancy version sequence using the offset value, each redundancy version value of the first redundancy version sequence, and a modulo operator that results in each redundancy version value of the second redundancy version sequence;
means for determining a starting redundancy version sequence position of an initial repetition of the uplink transmission from among zero-value redundancy version values of both the first redundancy version sequence and the second redundancy version sequence;
means for transmitting a first repetition of the first set of repetitions according to a first redundancy version value of the first redundancy version sequence; and
means for transmitting a second repetition of the second set of repetitions according to a second redundancy version value of the second redundancy version sequence, wherein one of the first repetition or the second repetition is the initial repetition.

18. The UE of claim 17, wherein the means for determining the second redundancy version sequence comprise:
means for determining the second redundancy version sequence by adding the offset value to each redundancy version value of the first redundancy version sequence and applying the modulo operator with a length of the first redundancy version sequence that results in each redundancy version value of the second redundancy version sequence.

19. The UE of claim 17, further comprising:
means for determining that the starting redundancy version sequence position of the initial repetition of the uplink transmission is not a last repetition occasion of a combination of the first set of repetitions and the second set of repetitions.

20. The UE of claim 19, wherein a number of configured repetitions is greater than or equal to eight and the starting redundancy version sequence position of the initial repetition of the uplink transmission is not the last repetition occasion based at least in part on the number of configured repetitions being greater than or equal to eight.

21. The UE of claim 17, wherein the means for receiving the one or more control messages comprise:
means for receiving a downlink control information message that indicates an order of transmission of the first set of repetitions and the second set of repetitions, wherein the first redundancy version sequence is applied to the first set of repetitions and the second redundancy version sequence is applied to the second set of repetitions based at least in part on the order of transmission.

22. The UE of claim 17, further comprising:
means for transmitting subsequent repetitions of the first set of repetitions using respective subsequent redundancy version values of the first redundancy version sequence; and
means for transmitting subsequent repetitions of the second set of repetitions using respective subsequent redundancy version values of the second redundancy version sequence.

23. The UE of claim 17, wherein one or more repetitions of the first set of repetitions and one or more repetitions of the second set of repetitions are transmitted according to a cyclic beam mapping pattern or a sequential beam mapping pattern.

24. The UE of claim 17, wherein the first set of repetitions are associated with a first sounding reference signal resource set and the second set of repetitions are associated with a second sounding reference signal resource set.

25. A non-transitory computer-readable medium storing code for wireless communications at a user equipment (UE), the code comprising instructions executable by a processor to:
receive one or more control messages that activate or schedule a first set of repetitions of an uplink transmission corresponding to a first transmission/reception point and a second set of repetitions of the uplink transmission corresponding to a second transmission/reception point, wherein the one or more control messages indicate a first redundancy version sequence and an offset value;
determine a second redundancy version sequence using the offset value, each redundancy version value of the first redundancy version sequence, and a modulo operator that results in each redundancy version value of the second redundancy version sequence;
determine a starting redundancy version sequence position of an initial repetition of the uplink transmission from among zero-value redundancy version values of both the first redundancy version sequence and the second redundancy version sequence;
transmit a first repetition of the first set of repetitions according to a first redundancy version value of the first redundancy version sequence; and
transmit a second repetition of the second set of repetitions according to a second redundancy version value of the second redundancy version sequence, wherein one of the first repetition or the second repetition is the initial repetition.

26. The non-transitory computer-readable medium of claim 25, wherein the instructions to determine the second redundancy version sequence are executable by the processor to:
determine the second redundancy version sequence by adding the offset value to each redundancy version value of the first redundancy version sequence and applying the modulo operator with a length of the first redundancy version sequence that results in each redundancy version value of the second redundancy version sequence.

27. The non-transitory computer-readable medium of claim 25, wherein the instructions are further executable by the processor to:
determine that the starting redundancy version sequence position of the initial repetition of the uplink transmission is not a last repetition occasion of a combination of the first set of repetitions and the second set of repetitions.

28. The non-transitory computer-readable medium of claim 27, wherein a number of configured repetitions is greater than or equal to eight and the starting redundancy version sequence position of the initial repetition of the uplink transmission is not the last repetition occasion based at least in part on the number of configured repetitions being greater than or equal to eight.

29. The non-transitory computer-readable medium of claim 25, wherein the instructions to receive the one or more control messages are executable by the processor to:
receive a downlink control information message that indicates an order of transmission of the first set of repetitions and the second set of repetitions, wherein the first redundancy version sequence is applied to the first set of repetitions and the second redundancy version sequence is applied to the second set of repetitions based at least in part on the order of transmission.

30. The non-transitory computer-readable medium of claim 25, wherein the instructions are further executable by the processor to:
transmit subsequent repetitions of the first set of repetitions using respective subsequent redundancy version values of the first redundancy version sequence; and
transmit subsequent repetitions of the second set of repetitions using respective subsequent redundancy version values of the second redundancy version sequence.

31. The non-transitory computer-readable medium of claim 25, wherein one or more repetitions of the first set of repetitions and one or more repetitions of the second set of repetitions are transmitted according to a cyclic beam mapping pattern or a sequential beam mapping pattern.

32. The non-transitory computer-readable medium of claim 25, wherein the first set of repetitions are associated with a first sounding reference signal resource set and the second set of repetitions are associated with a second sounding reference signal resource set.

* * * * *